US00RE46128E

(19) United States
(12) Reissued Patent
Shiohara

(10) Patent Number: US RE46,128 E
(45) Date of Reissued Patent: Aug. 30, 2016

(54) SHEET TRAY DEVICE WITH SLIDE PORTION AND IMAGE FORMING APPARATUS HAVING THE SHEET TRAY DEVICE

(75) Inventor: Yukio Shiohara, Nagoya (JP)

(73) Assignee: Brother Kogyo Kabushiki Kaisha, Nagoya-shi, Aichi-ken (JP)

(21) Appl. No.: 13/542,373

(22) Filed: Jul. 5, 2012

Related U.S. Patent Documents

Reissue of:
(64) Patent No.: 7,748,692
Issued: Jul. 6, 2010
Appl. No.: 11/677,122
Filed: Feb. 21, 2007

(30) Foreign Application Priority Data

Feb. 24, 2006 (JP) ..... 2006-048514

(51) Int. Cl.
*B65H 3/44* (2006.01)
*B65H 5/26* (2006.01)
(Continued)

(52) U.S. Cl.
CPC ..... *B65H 1/26* (2013.01); *B65H 2402/31* (2013.01); *B65H 2402/32* (2013.01); *B65H 2405/31* (2013.01); *B65H 2405/332* (2013.01)

(58) Field of Classification Search
USPC ..... 271/162, 164, 145, 9.07, 9.08, 9.11
See application file for complete search history.

(56) References Cited

U.S. PATENT DOCUMENTS 4,017,181 A * 4/1977 Komaba et al. ..... 271/9.11
4,131,274 A * 12/1978 Sue ..... 271/9.11
(Continued)

FOREIGN PATENT DOCUMENTS

JP 61188336 * 8/1986
JP S61-188337 A 8/1986
(Continued)

OTHER PUBLICATIONS

European Patent Office; European Search Report in Application No. 07250754.4 (counterpart to the above-captioned U.S. patent application) mailed Apr. 9, 2009.

*Primary Examiner* — Joseph Kaufman
(74) *Attorney, Agent, or Firm* — Baker Botts L.L.P.

(57) ABSTRACT

A sheet tray device [including] *includes* (a) a first tray and (b) a second tray which is disposed on an upper side of the first tray and which includes (b-1) a support member which bridges between opposite side walls of the first tray and which is movable relative to the opposite side walls, and (b-2) a supported body pivotably supported by the support member. Each of the opposite side walls includes a first rail portion and a second rail portion that is located on an upper side of the first rail portion. The support member includes [(i)] a main slide portion that is slidably held in contact with an upper surface of the first rail portion, [(ii)] a removal-preventing slide portion that extends through a space between the first and second rail portions, and [(iii)] a rotation-preventing slide portion that is slidably held in contact with a side surface of the first rail portion. [Also disclosed is an image forming apparatus including the sheet tray device.]

13 Claims, 28 Drawing Sheets

(51) Int. Cl.
*B65H 1/30* (2006.01)
*B65H 1/26* (2006.01)

(56) References Cited

U.S. PATENT DOCUMENTS

| | | | | | |
|---|---|---|---|---|---|
| 4,538,799 | A | * | 9/1985 | Bhagwat | 271/164 |
| 5,737,682 | A | * | 4/1998 | Yamagishi | 399/402 |
| 5,823,522 | A | * | 10/1998 | Fujiwara et al. | 271/4.08 |
| 5,845,899 | A | * | 12/1998 | Satoh et al. | 271/9.11 |
| 6,029,970 | A | * | 2/2000 | Hwang | 271/9.08 |
| 6,055,410 | A | * | 4/2000 | Marumoto et al. | 271/9.11 |
| 6,227,533 | B1 | * | 5/2001 | Jang | 271/109 |
| 6,406,201 | B1 | * | 6/2002 | Beretta et al. | 400/605 |
| 6,659,444 | B2 | * | 12/2003 | Kawarama | 271/9.09 |
| 7,484,727 | B2 | * | 2/2009 | Yang | 271/171 |
| 7,543,809 | B2 | * | 6/2009 | Shiohara | 271/9.11 |
| 2004/0070134 | A1 | * | 4/2004 | Eskey | 271/9.07 |
| 2004/0253032 | A1 | * | 12/2004 | Kojima | 400/101 |
| 2005/0242485 | A1 | | 11/2005 | Shiohara et al. | |

FOREIGN PATENT DOCUMENTS

| | | | |
|---|---|---|---|
| JP | 61217440 | * | 9/1986 |
| JP | 06064761 | * | 3/1994 |
| JP | 2005 314067 | | 11/2005 |

* cited by examiner

ENLARGEMENT OF PORTION B

C—C

D—D

E–E

F—F

F-F

F-F

F-F

G–G

G—G

G—G

H–H

A–A

SHEET TRAY DEVICE WITH SLIDE PORTION AND IMAGE FORMING APPARATUS HAVING THE SHEET TRAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue application of U.S. Pat. No. 7,748,692 B2, which is issued from U.S. application Ser. No. 11/677,122 and which* is based on Japanese Patent Application No. 2006-048514 filed on Feb. 24, 2006, the [content] *contents* of which [is] *are* incorporated hereinto by reference.

BACKGROUND OF THE INVENTION

1. Field of the Invention

The present invention relates to a sheet tray device for accommodating a media sheet such as paper sheet, OHP sheet, envelop and postal card, and also an image forming apparatus including such a sheet tray device.

2. Discussion of Related Art

It is common that a sheet tray device for use in an image forming apparatus is provided by a single tray member that is removably introduced into a main body of the image forming apparatus, as disclosed in JP-2005-314067A.

The sheet tray device is required to accommodate the media sheets of various sizes such as A4-sized papers and A-5 sized papers. However, the media sheets of plurality of different sizes can not be concurrently accommodated in the single tray member. Every time the size of the media sheets (on which an image forming or printing operation is to be performed) is changed to another size of those, the sheet tray device has to be removed from the main body of the image forming apparatus, for carrying out a sheet replacement operation, namely, for changing the media sheets with those of the other size.

That is, where the image forming operation is to be carried out on the media sheets of various sizes, the sheet replacement operation has to be frequently done. Since such a sheet replacement operation is generally cumbersome, the conventional image forming apparatus is poor in maneuverability, particularly, for a user who has to carry out the image forming operation on the media sheets of various sizes.

The above problem could be solved, for example, by employing an image forming apparatus such as large-sized copier machine equipped with a sheet tray device that has a plurality of trays for accommodating respective different sizes of media sheets. In the large-sized copier machine in which the media sheets of different sizes can be concurrently accommodated in the respective trays, the sheet replacement operation is not required every time the size of the media sheets is changed. However, the large-sized image forming apparatus is not feasible for a domestic use in which there is not a large space available for installation of the apparatus.

For solving the above problem, the present inventor manufactured, by way of trial, a double-deck sheet tray device including the conventional tray as a first tray for accommodating first size sheets, and a second tray for accommodating second size sheets whose size is smaller than that of the first size sheets, wherein the second tray is movably disposed on an upper side of the first tray. However, another problem is encountered in this double-deck sheet tray device. The problem is that refilling the first tray with the sheets could be made difficult by the arrangement in which the second tray is disposed to cover an upper opening of the first tray.

In view of this, in the double-deck sheet tray device manufactured by way of trial, the second tray is constituted by a support member and a supported body. The support member is arranged to bridge between opposite side walls of the first tray, while the supported body is supported by the support member and is pivotable to open and close the upper opening of the first tray. However, the double-deck sheet tray device suffers from still another problem that the second tray could be rotated relative to the first tray or removed from the first tray during movement of the second tray relative to the first tray.

SUMMARY OF THE INVENTION

The present invention was made in view of the background prior art discussed above. It is therefore a first object of the invention to provide a sheet tray device in which a second tray can be advantageously moved relative to a first tray without risk of rotation of the second tray relative to the first tray or removal of the second tray from the first tray. It is a second object of the invention to provide an image forming apparatus including the sheet tray device that provides the above technical advantage. The first object may be achieved according to a first aspect of the invention that is described below. The second object may be achieved according to a second aspect of the invention that is described below.

The first aspect of the invention provides a sheet tray device that is removably introduced into a main body of an image forming apparatus through an opening of the main body, so as to hold a media sheet that is to be supplied to an image forming unit of the image forming apparatus by which an image forming operation is performed on the media sheet. The sheet tray device includes: (a) a first tray accommodating a larger or first size sheet as the media sheet; and (b) a second tray disposed on an upper side of the first tray and accommodating a smaller or second size sheet as the media sheet. The second tray includes (b-1) a support member which bridges between opposite side walls of the first tray and which is movable relative to the opposite side walls, and (b-2) a supported body pivotably supported by the support member so as to open and close an upper opening of the first tray. Each of the opposite side walls of the first tray includes first and second rail portions that extend in a rail extending direction in which the support member is movable relative to the opposite side walls. The second rail portion is located on an upper side of the first rail portion and being spaced apart from the first rail portion. The support member of the second tray includes (i) a main slide portion that is slidably held in contact with an upper surface of the first rail portion, (ii) a removal-preventing slide portion that extends through a gap or space between the first and second rail portions so as to prevent removal of the support member of the second tray from the first tray, and (iii) a rotation-preventing slide portion that is slidably held in contact with an inside or outside surface of the first rail portion so as to prevent rotation of the support member of the second tray relative to the first tray.

In the sheet tray device constructed according to the first aspect of the invention, the main slide portion is slidably held in contact with the upper surface of the first rail portion, whereby the support member of the second tray is movably held by the first tray.

Further, since the removal-preventing slide portion extends through the space between the first and second rail portions, removal of the support member of the second tray from the first tray can be prevented by engagement of the removal-preventing slide portion with at least one of the first and second rail portions.

Moreover, since the rotation-preventing slide portion is slidably held in contact with the inside or outside surface of the first rail portion, it is possible to prevent rotation of the second tray relative to the first tray.

Therefore, in the present sheet tray device, it is possible to avoid problems such as rotation of the second tray relative to the first tray and removal of the second tray from the first tray, when the second tray is moved relative to the first tray.

It is noted that, in the present sheet tray device, the main slide portion and the rotation-preventing slide portion may be provided by either respective members that are independent from each other, or may be formed integrally with each other to be provided by a single common member.

It is further noted that, in the present sheet tray device, the first and second rail portions may be either offset or not offset from each other in a lateral direction in which the opposite side walls of the first tray are opposed to each other.

The second aspect of the invention provides an image forming apparatus including the sheet tray device defined in the first aspect of the invention, an image forming unit operable to perform an image forming operating on a media sheet, and a sheet supplying unit operable to supply the media sheet held by the sheet tray device, to the image forming unit.

In the image forming apparatus according to this second aspect of the invention, owing to incorporation of the sheet tray device defined in the first aspect of the invention, it is possible to enjoy the above-described technical advantages provided by the sheet tray device. That is, in the sheet tray device of the image forming apparatus, the second tray can be advantageously moved relative to the first tray without risk of rotation of the second tray relative to the first tray or removal of the second tray from the first tray.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENT

There will be described an image forming apparatus 100 that is constructed according to an embodiment of the invention. The image forming apparatus 100 is a multi function device having various functions such as printer function, scanner function, color copier function and facsimile function.

1. Basic Construction of Image Forming Apparatus 100

Figure 1:
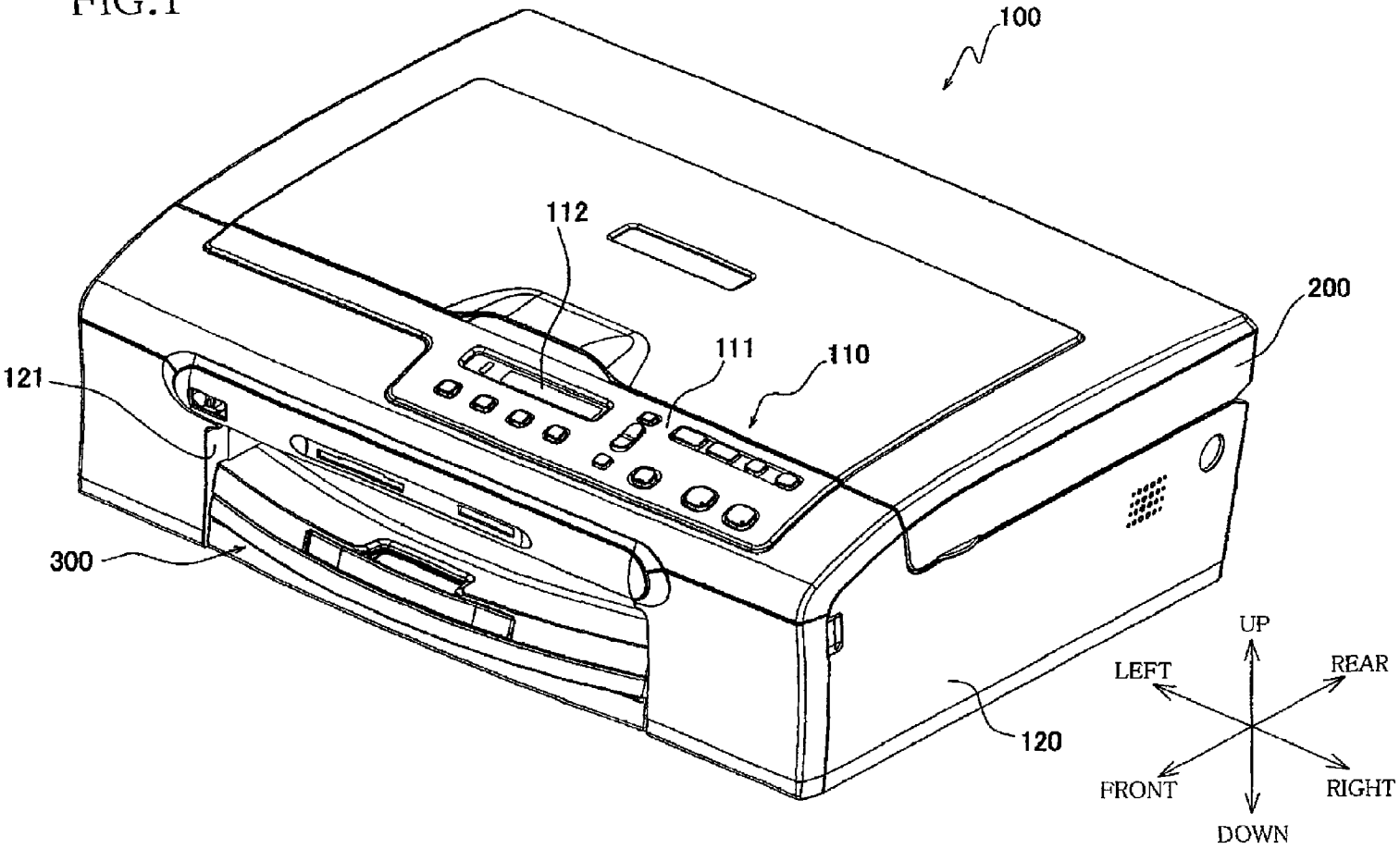
FIG. 1 is a perspective view of an image forming apparatus 100 that is constructed according to an embodiment of the present invention.
Figure 2:
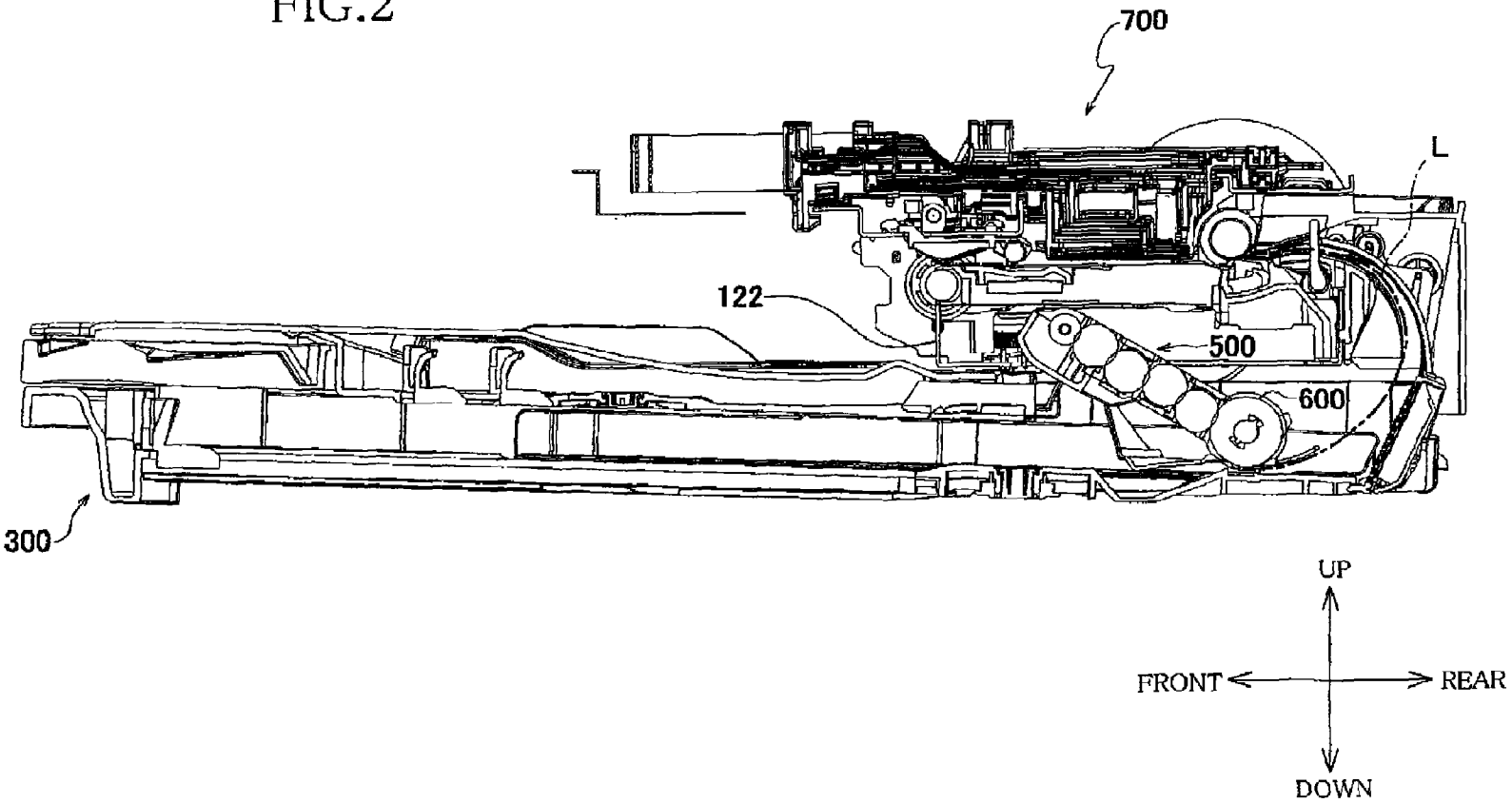
FIG. 2 is a side view partially in cross section of a sheet supplying unit 500 and an image forming unit 700 that are incorporated in the image forming apparatus 100 of FIG. 1.

FIG. 1 is a perspective view of the image forming apparatus 100. FIG. 2 is a side view partially in cross section of a sheet supplying unit 500 and an image forming unit 700 that are incorporated in the image forming apparatus 100 of FIG. 1. The image forming apparatus 100 has a main body in the form of a casing body 120 that is provided by a rectangular parallelepiped box-like body made of a resin. This apparatus 100 is installed for use, with its front portion and upper portion as seen in FIG. 1 facing forwardly and upwardly, respectively.

An operator's control panel 110 is provided on an upper surface of a front portion of the casing body 120, and includes an input portion 111 and a display portion 112. The input portion 111 has various keys that are manually operable by an operator of the apparatus 100 to input various command signals for various operations to be performed by the apparatus 100. The display portion 112 is provided for indicating a message and an image to provide the operator with information.

A scanner unit 200 is provided in an upper portion of the casing body 120 and is located on a rear side of the operator's control panel 110, so as to read an image or script carried on an original. The scanner unit 200 serves as an image reader that is operable when the scanner function, color copy function or facsimile function is used. Since the scanner unit 200 has a known construction with an image pick-up device such as CCD and CIS, redundant description of the scanner unit 200 is not provided in the present specification.

As shown in FIG. 2, a sheet tray device 300 is provided in a lower portion of the casing body 120, so as to hold or accommodate recording or media sheets such as paper sheets and OHP sheets that are superposed on each other. The sheet tray device 300 can be removed from the casing body 120 of the apparatus 100, by forwardly and horizontally moving the tray device 300 out of the casing body 120 through an opening 121 that is provided in a front surface of the casing body 120. The tray device 300 can be introduced into the casing body 120, by rearwardly and horizontally moving the tray device 300 into the casing body 120 through the opening 121.

A sheet supplying unit 500 is provided to feed or supply the media sheets stacked in the sheet tray device 300, one after another, to the image forming unit 700. The sheet supplying unit 500 is supported by a frame 122 (see FIG. 2) that is fixed to the casing body 120, so as to be located on an upper side of the sheet tray device 300.

In a rear end portion of the casing body 120 that corresponds to a rear end portion of the sheet tray device 300, a sheet feed path L is defined to interconnect the sheet tray device 300 and the image forming unit 700. The sheet feed path L has a U-shaped cross sectional shape as seen in FIG. 2, so that each of the media sheets separated from the sheet tray device 300 is first moved in a rearward direction and is then moved in a forward direction. That is, the sheet feed path has a U turn portion by which a feed direction of each media sheet is changed from the rearward direction to the forward direction by substantially about 180°.

The image forming unit 700 is provided on an upper side of the sheet supplying unit 500, so as to perform an image forming (printing) operation on each media sheet that has been fed (supplied) along the sheet feed path L. Each media sheet, after being subjected to the image forming operation, is discharged to a front portion of an upper surface of the sheet tray device 300. Since the image forming unit 700 is of a known inkjet type and accordingly has a known construction, redundant description of the image forming unit 700 is not provided in the present specification.

2. Construction of Sheet Tray Device 300

2.0. Description of Drawing related to Sheet Tray Device 300

Figure 3:
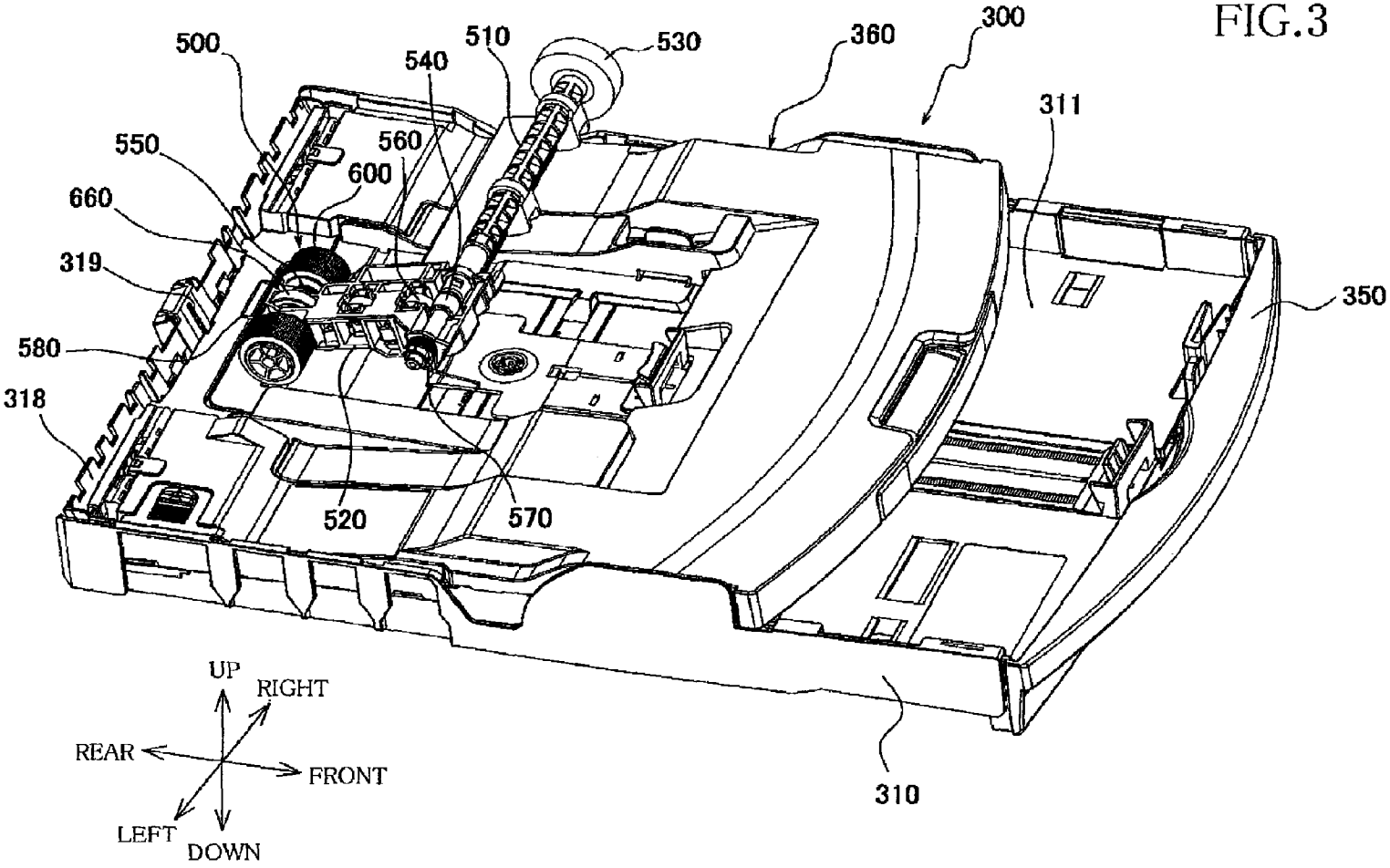
FIG. 3 is a perspective view of the sheet supplying unit 500 and a sheet tray device 300 that is to be removably introduced into the image forming apparatus 100 of FIG. 1, wherein the sheet tray device 300 includes a first tray 310 and a second tray 360.
Figure 4:
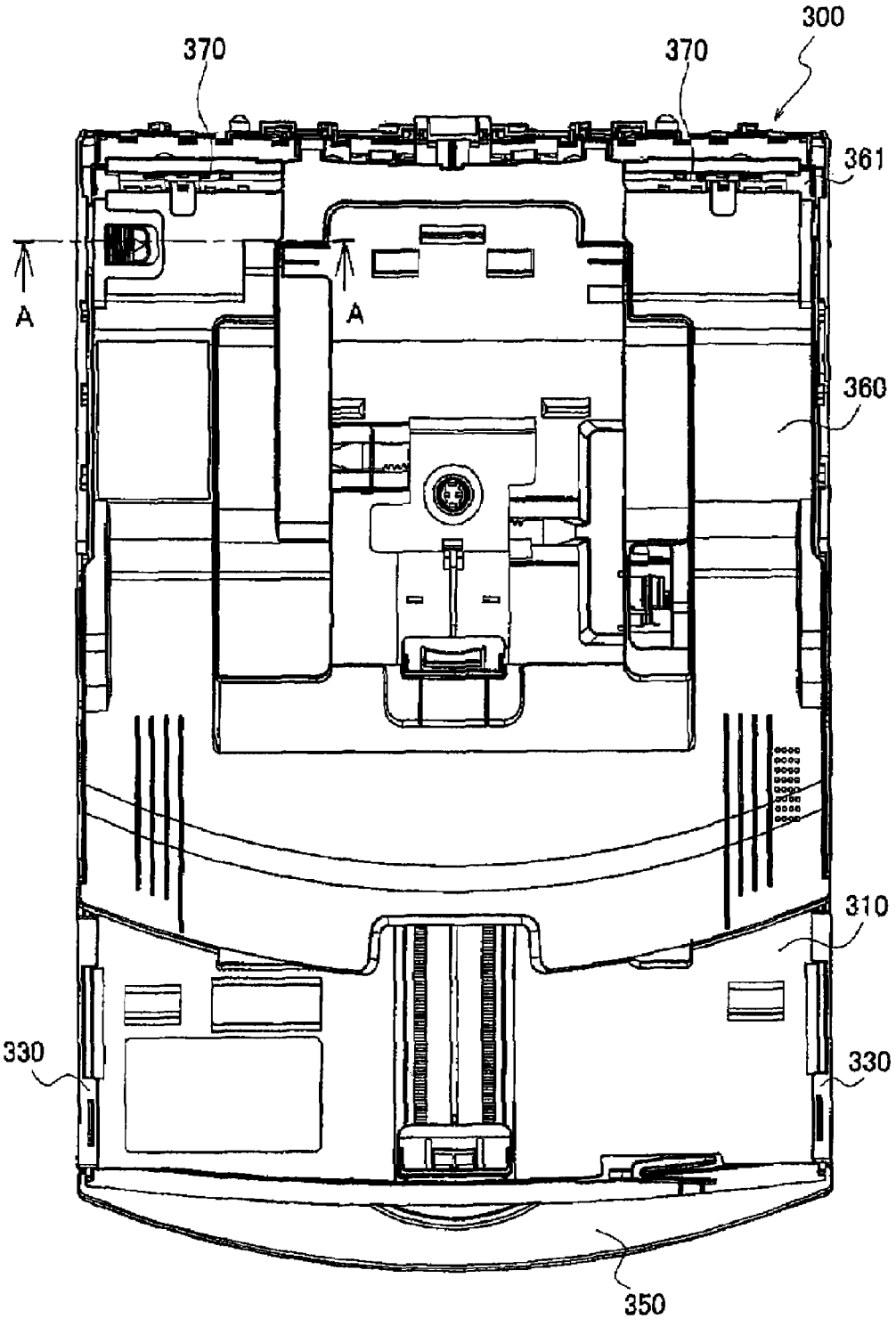
FIG. 4 is an upper plan view of the sheet tray device 300 of FIG. 3.
Figure 5:
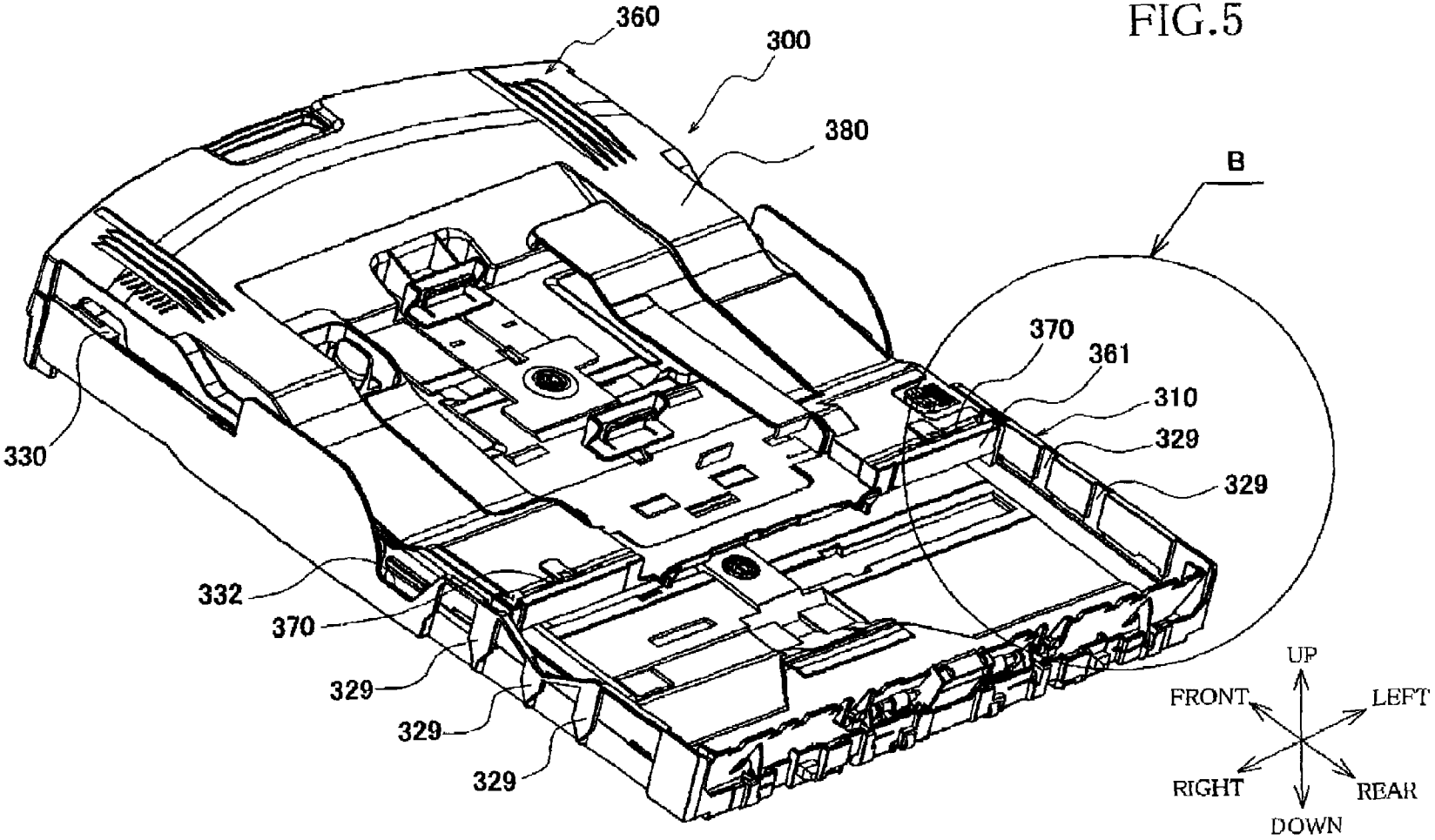
FIG. 5 is a perspective view of the sheet tray device 300 of FIG. 3 when the second tray 360 has been forwardly moved relative to the first tray 310.

FIG. 3 is a perspective view of the sheet supplying unit 500 and the sheet tray device 300 in a state in which a second tray (sub tray) 360 is mounted on a first tray (main tray) 310. FIG. 4 is an upper plan view of the sheet tray device 300 in the same state as in FIG. 3. FIG. 5 is a perspective view of the sheet tray device 300 in a state in which the second tray 360 is positioned in a front position relative to the first tray 310.

Figure 6:
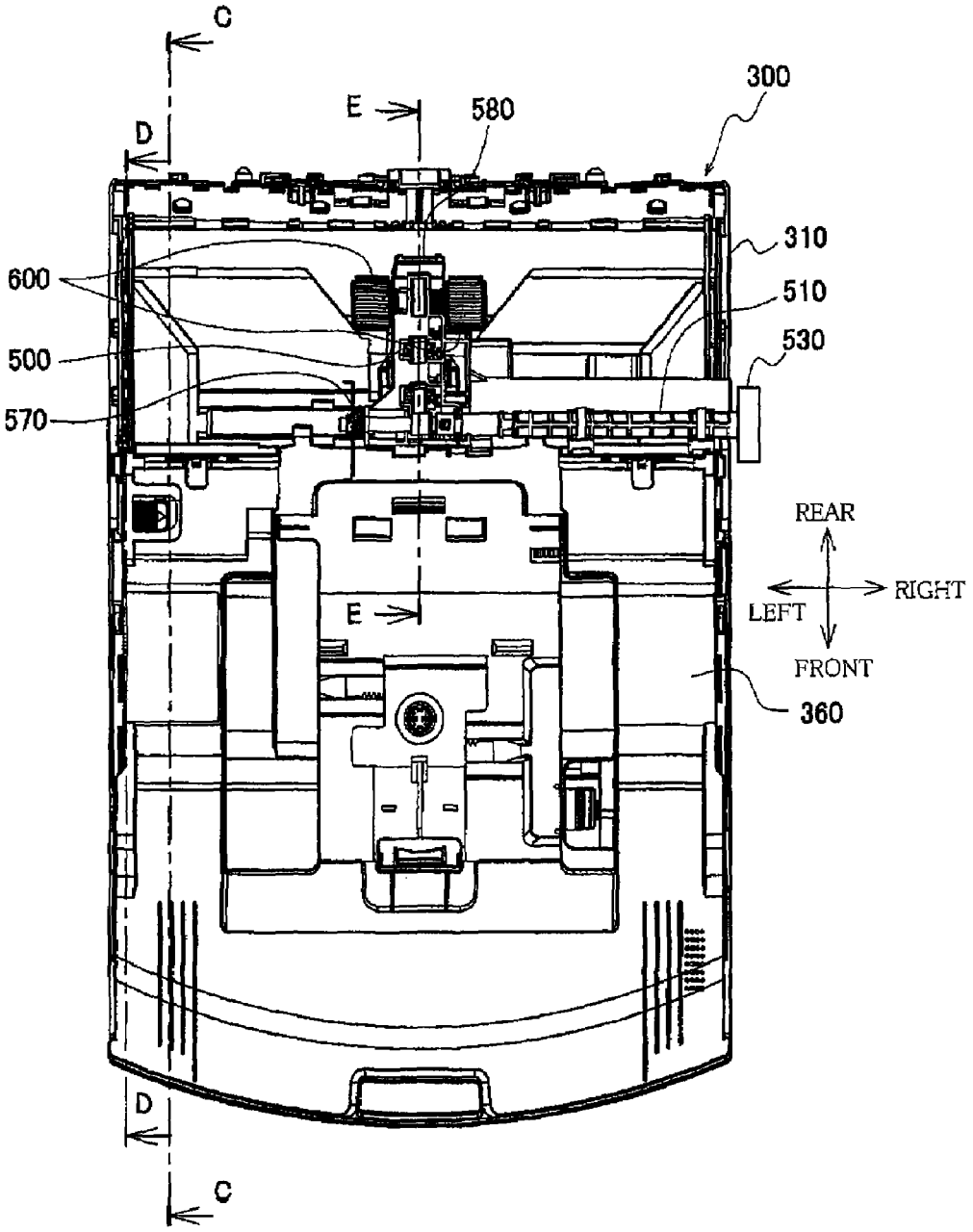
FIG. 6 is an upper plan view of the sheet tray device 300 of FIG. 3 together with the sheet supplying unit 500 when the second tray 360 has been forwardly moved relative to the first tray 310.
Figure 7:
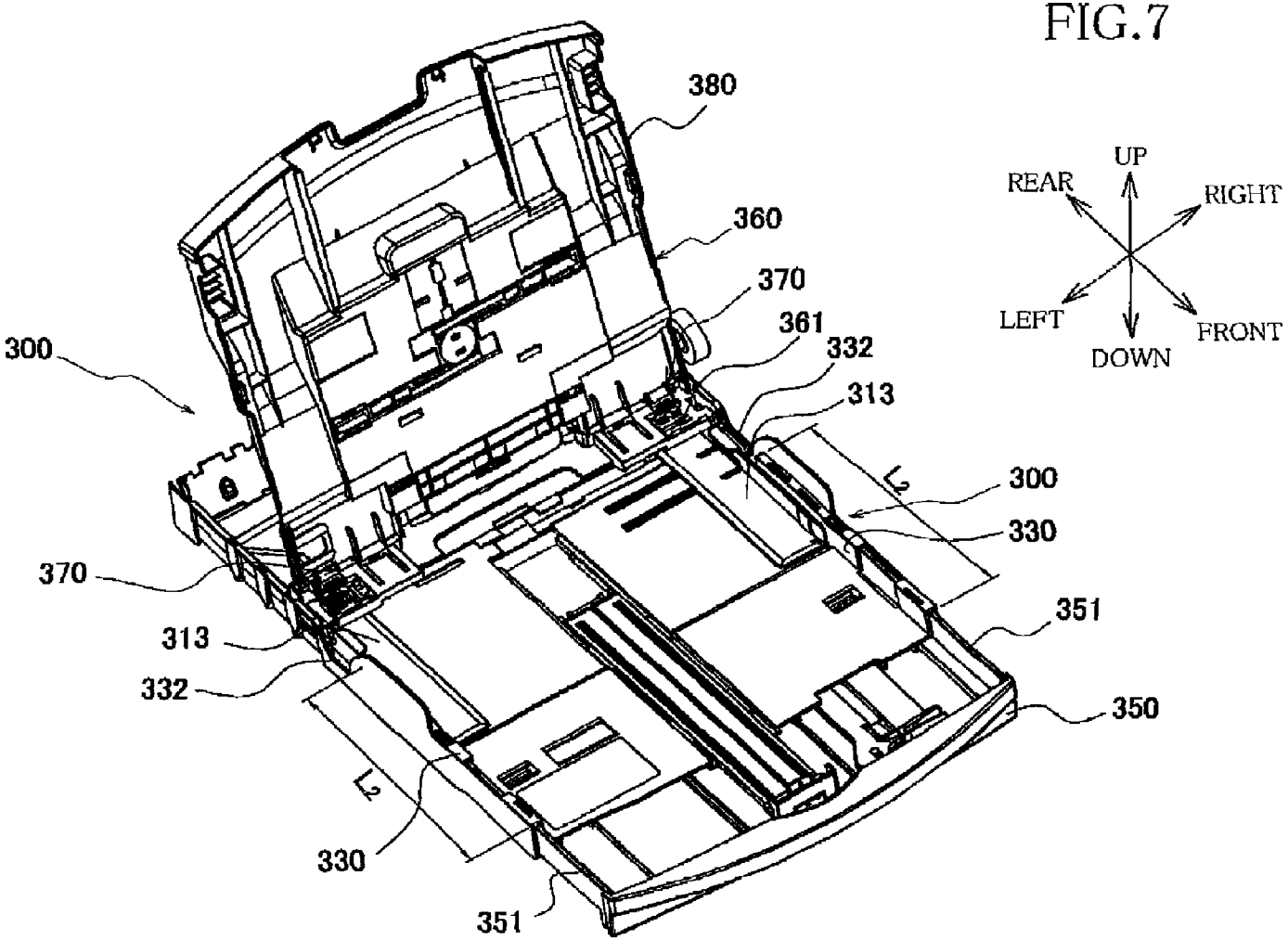
FIG. 7 is a perspective view of the sheet tray device 300 of FIG. 3 when an upper opening of the first tray 310 is exposed and an extension tray 350 is drawn out of the first tray 310.

FIG. 6 is an upper plan view of the sheet tray device 300 together with the sheet supplying unit 500 in the same state as in FIG. 5. FIG. 7 is a perspective view of the sheet tray device 300 in a state in which an upper opening of the first tray 310 is exposed and an extension tray 350 is drawn out of the first tray 310.

Figure 8:
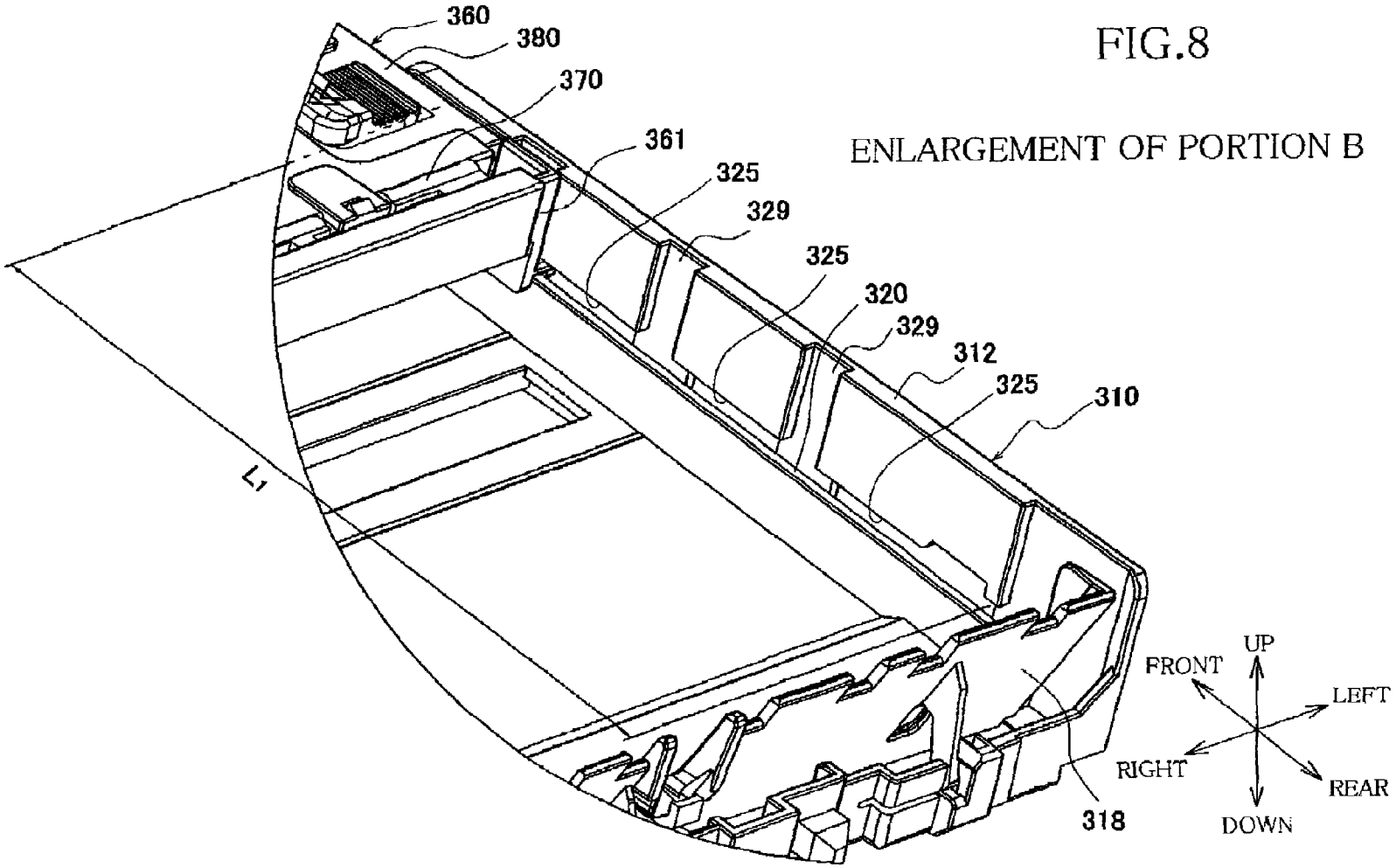
FIG. 8 is a perspective view showing in enlargement a portion B of FIG. 5.
Figure 9:
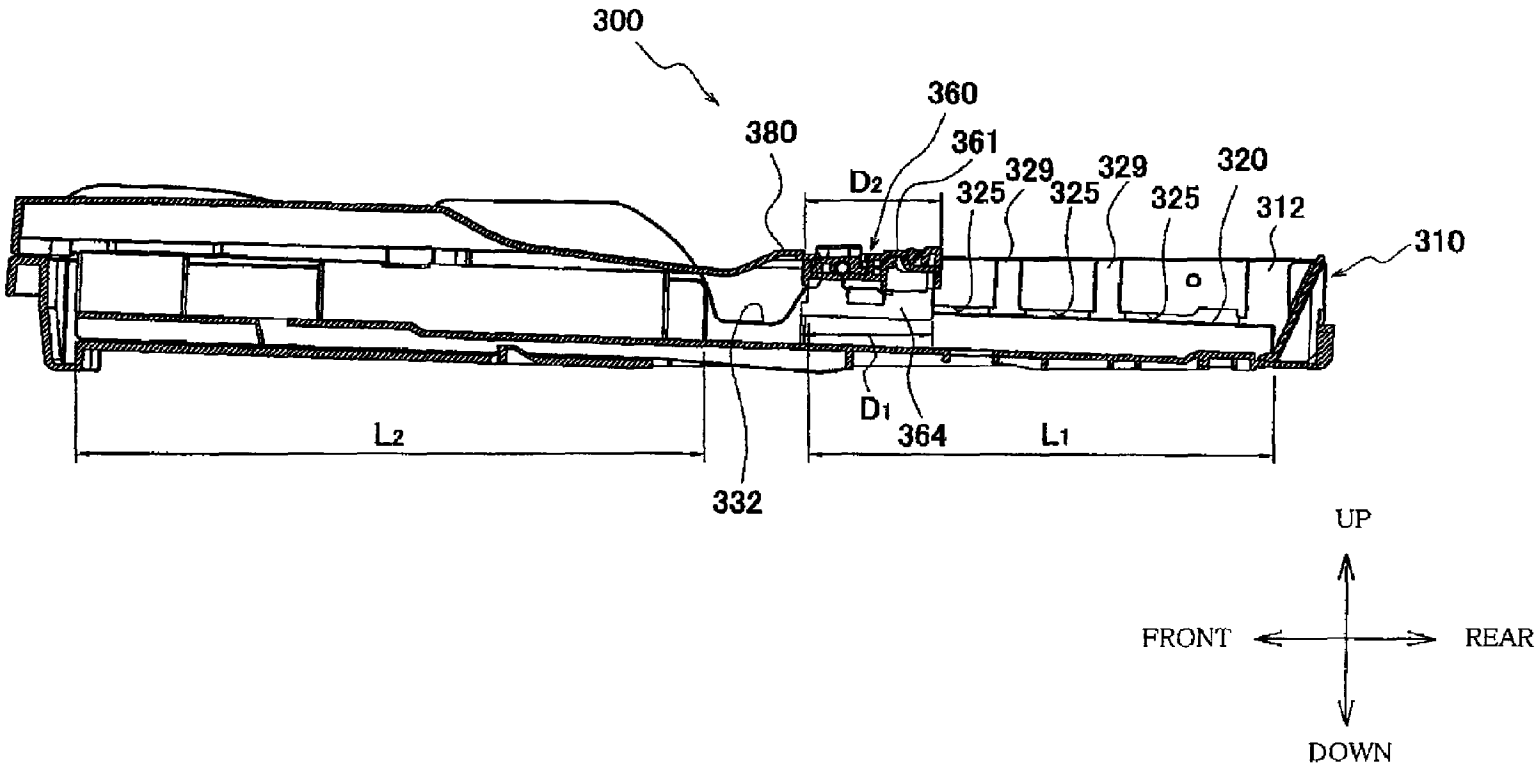
FIG. 9 is a cross sectional view taken along line C-C of FIG. 6.
Figure 10:
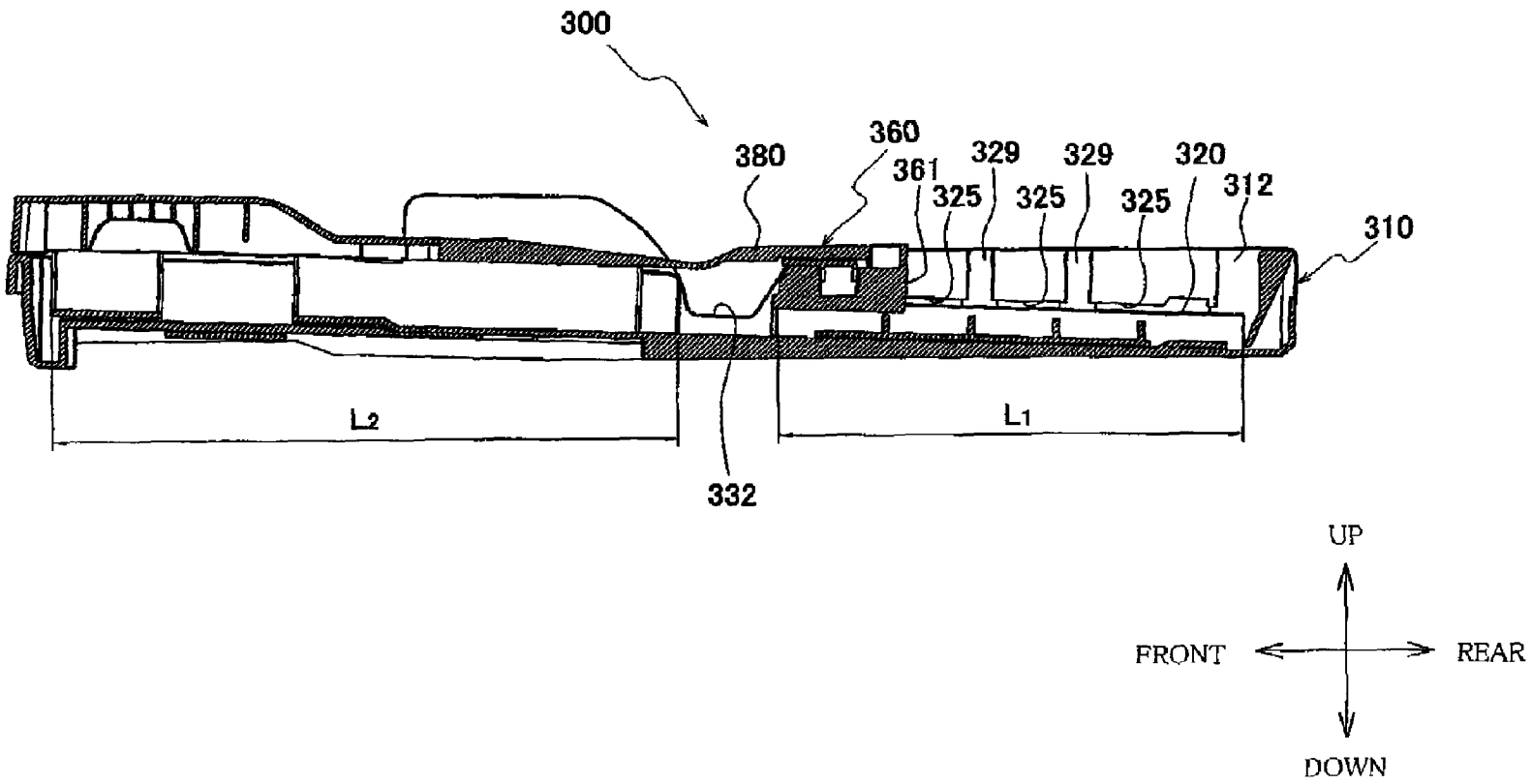
FIG. 10 is a cross sectional view taken along line D-D of FIG. 6.
Figure 11:
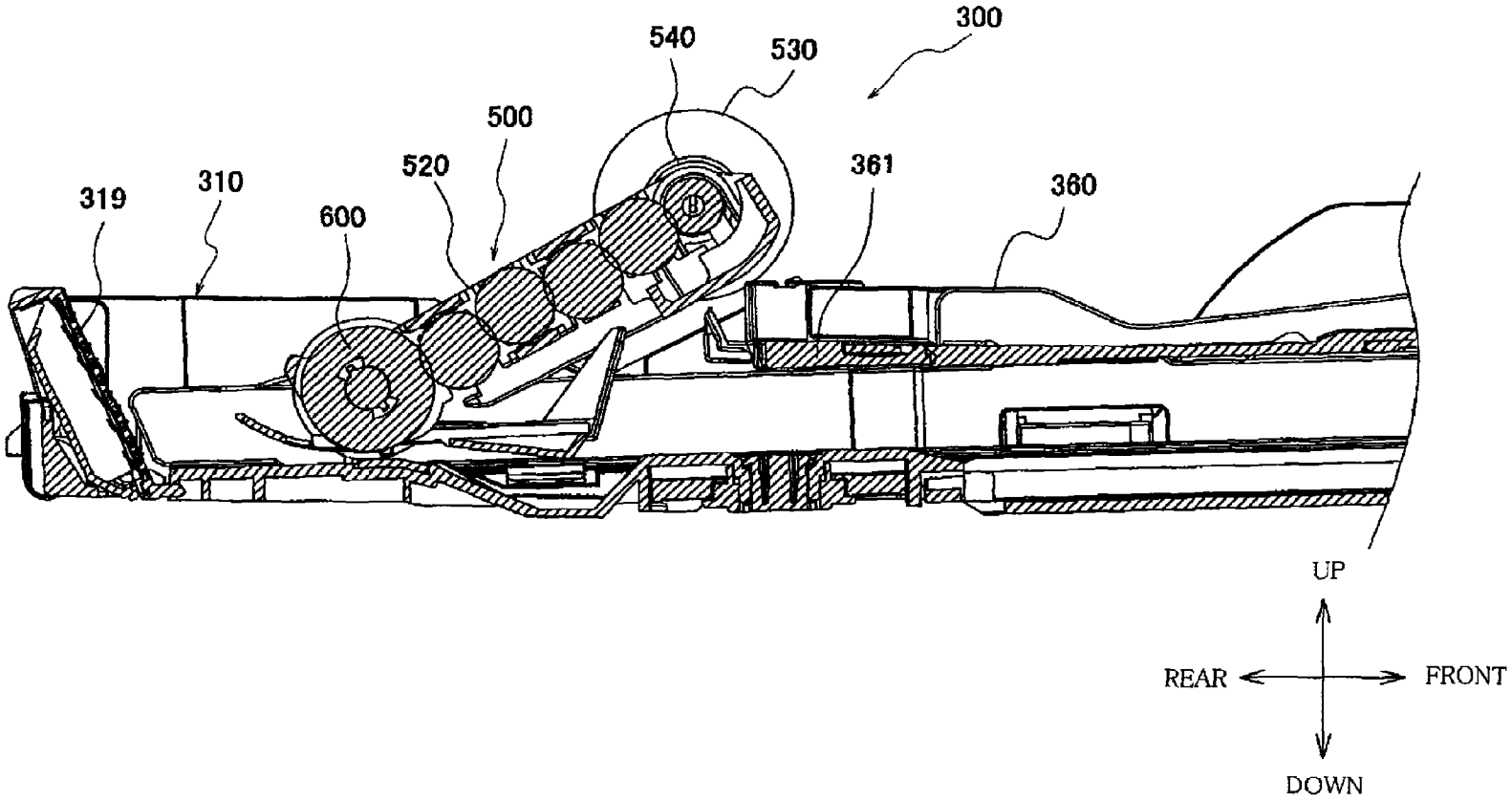
FIG. 11 is a cross sectional view taken along line E-E of FIG. 6.
Figure 12:
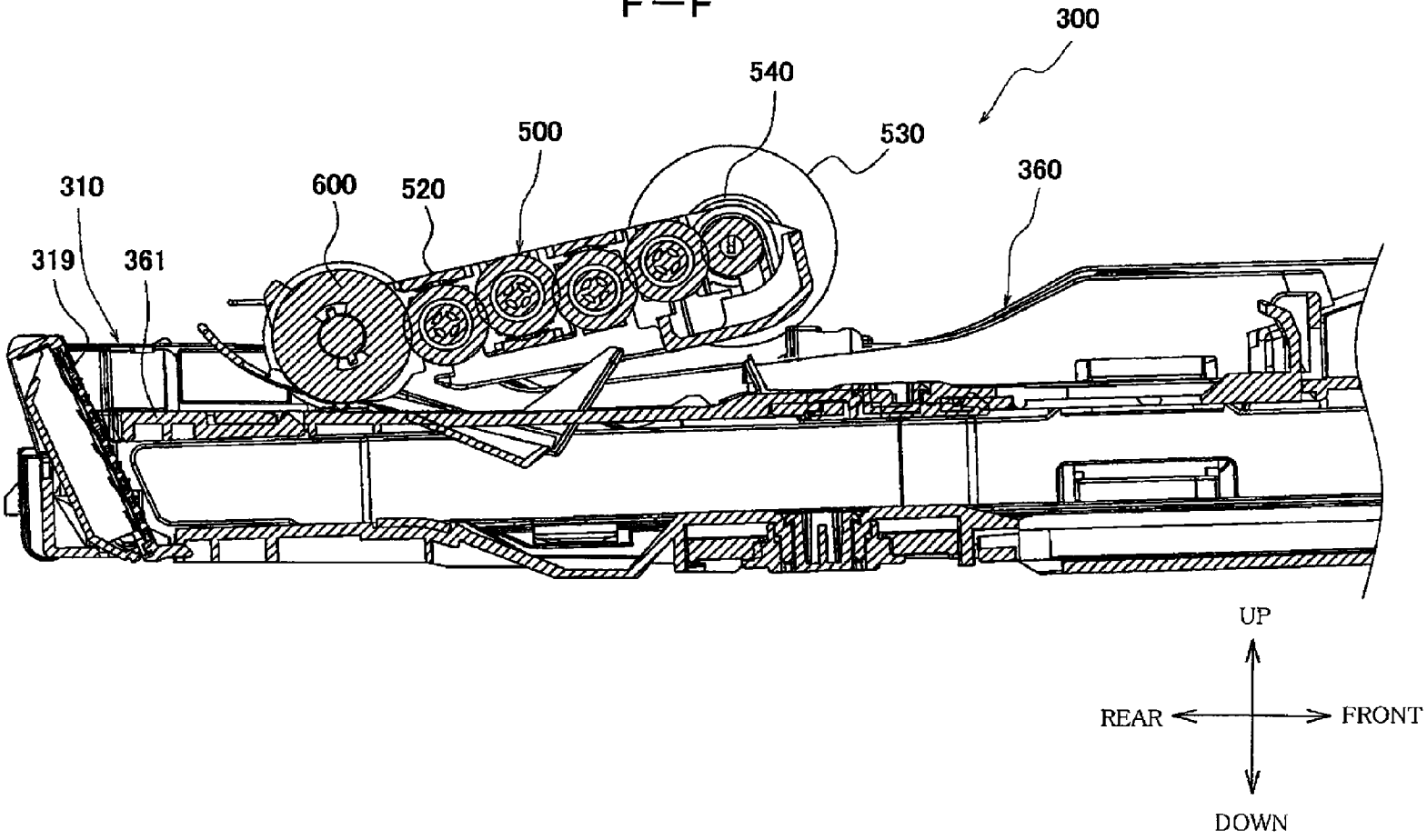
FIG. 12 is a cross sectional view taken along line E-E of FIG. 6 when the second tray 360 has been rearwardly moved relative to the first tray 310.
Figure 13:
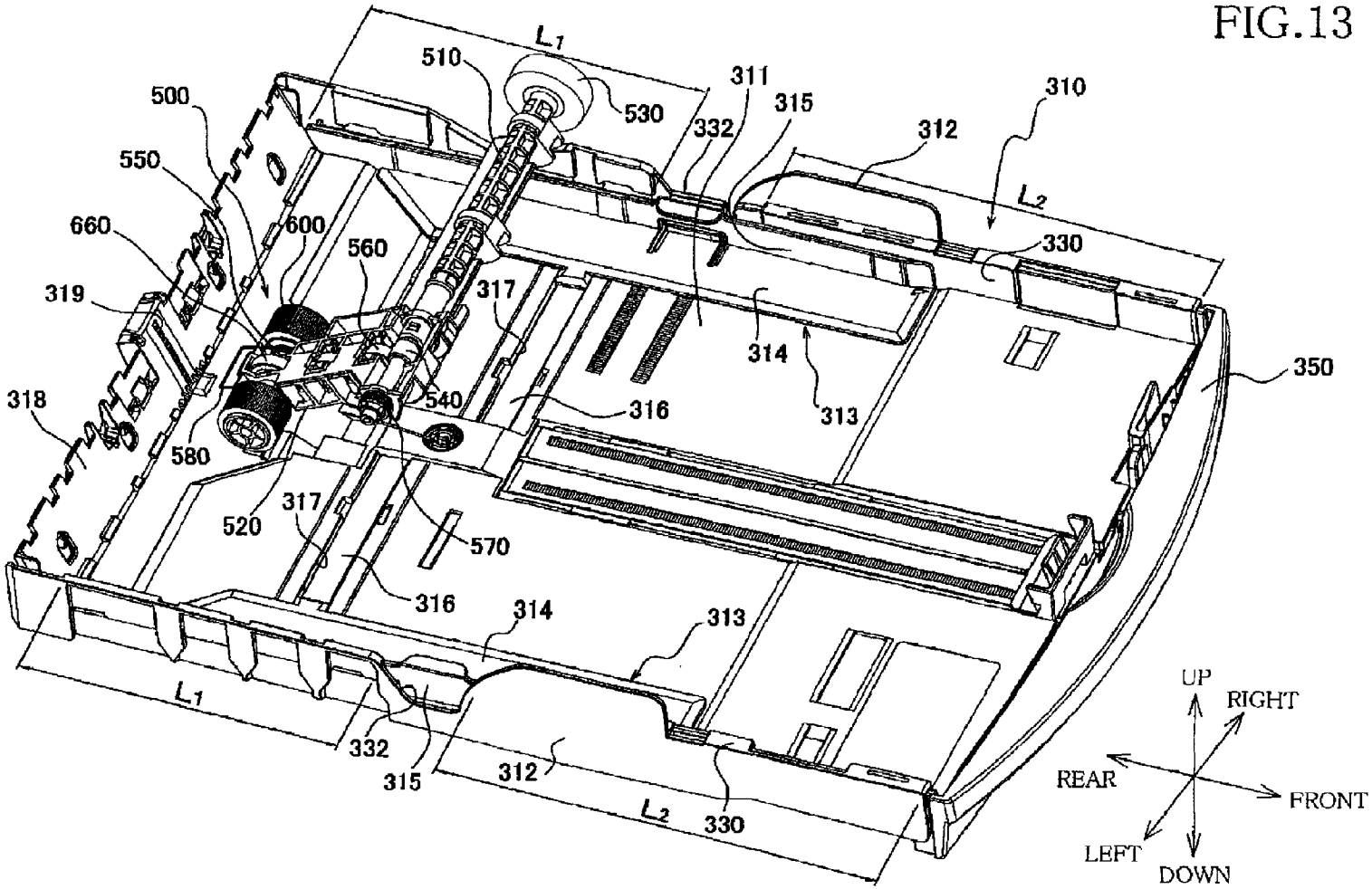
FIG. 13 is a perspective view of the sheet supplying unit 500 and the sheet tray device 300 of FIG. 3 in absence of the second tray 360.

FIG. 8 is a perspective view showing in enlargement a portion B of FIG. 5. FIG. 9 is a cross sectional view taken along line C-C of FIG. 6. FIG. 10 is a cross sectional view taken along line D-D of FIG. 6. FIG. 11 is a cross sectional view taken along line E-E of FIG. 6. FIG. 12 is a cross sectional view taken along line E-E of FIG. 6 in a state in which the second tray 360 is positioned in a rear position relative to the first tray 310. FIG. 13 is a perspective view of the sheet supplying unit 500 and the sheet tray device 300 without the second tray 360 being mounted on the first tray 310.

Figure 14:
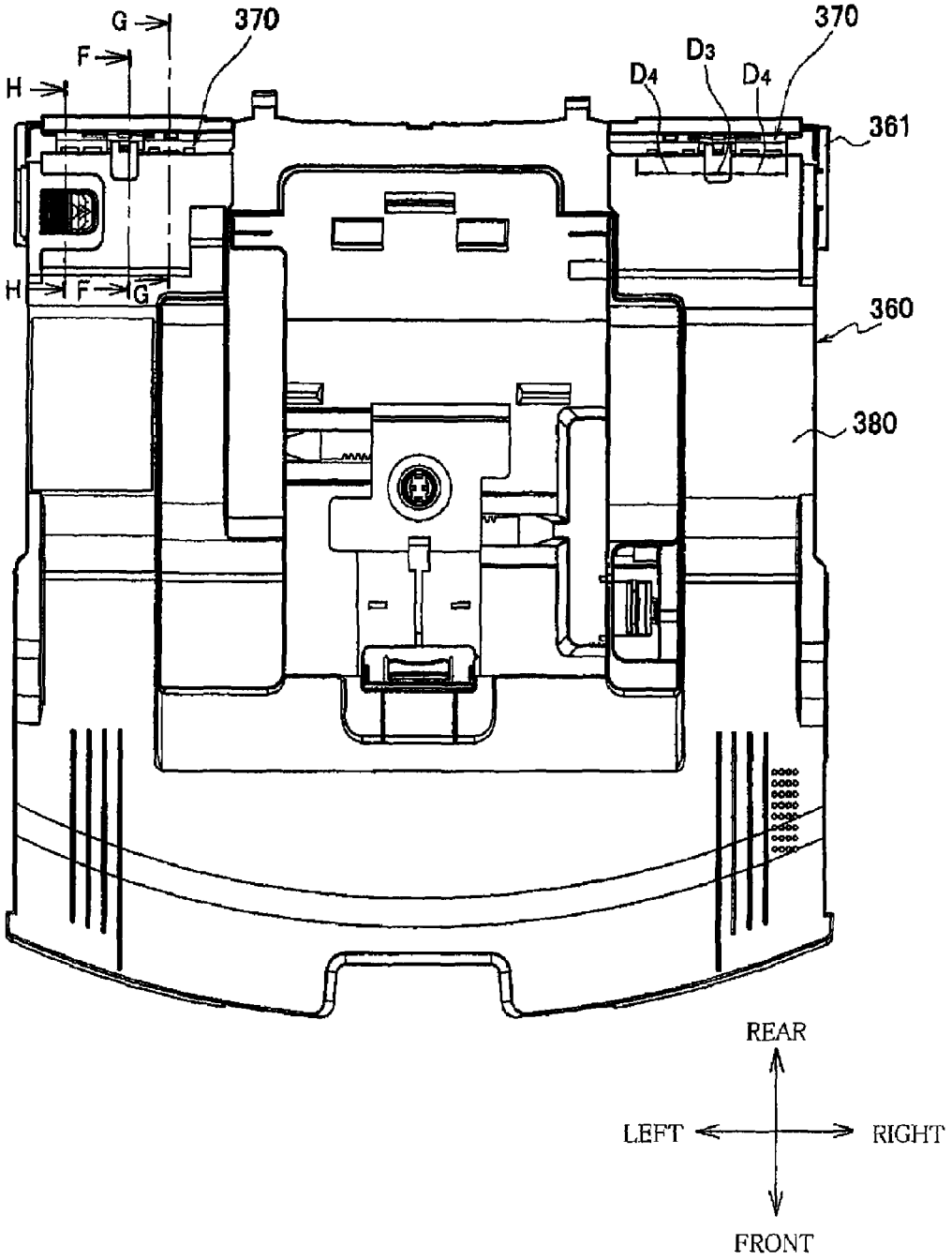
FIG. 14 is an upper plan view of the second tray 360.
Figure 15:
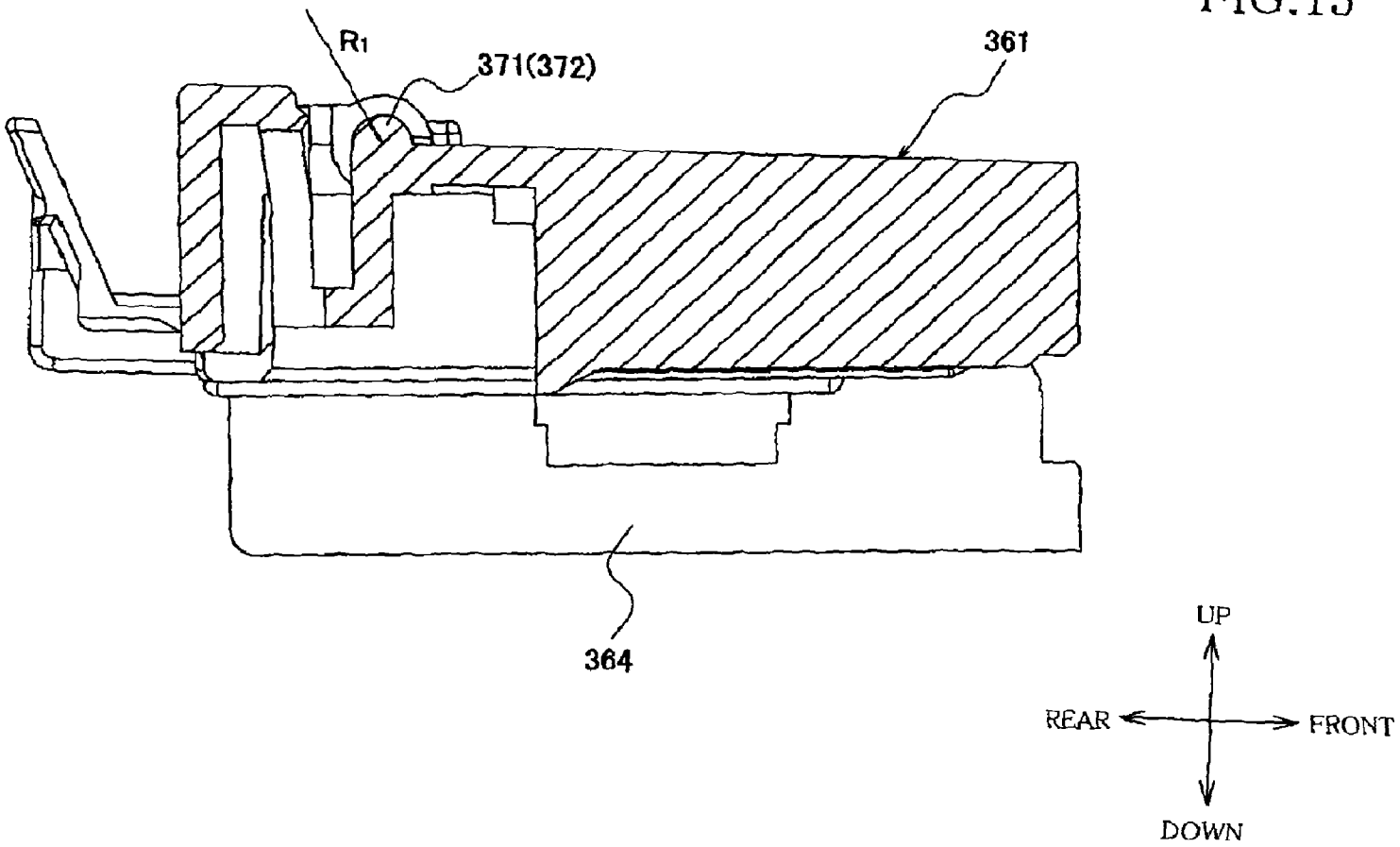
FIG. 15 is a cross sectional view of a support member 361 of the second tray 360, taken along line F-F of FIG. 14.
Figure 16:
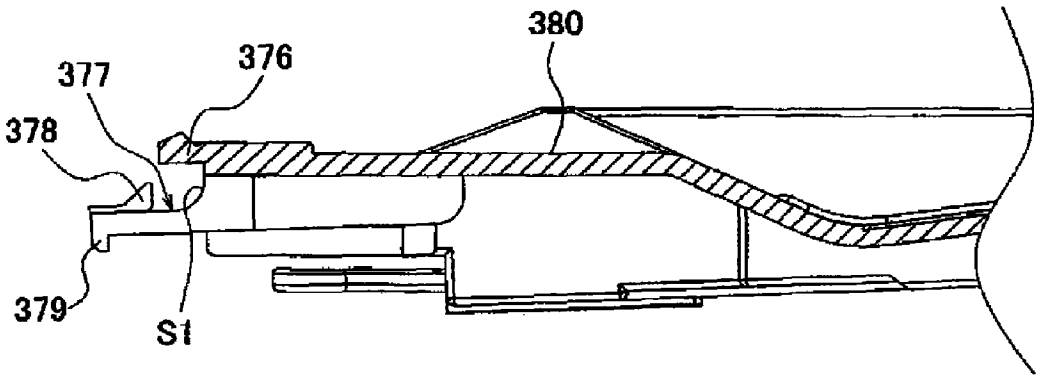
FIG. 16 is a cross sectional view of a supported body 380 of the second tray 360, taken along line F-F of FIG. 14.
Figure 16:
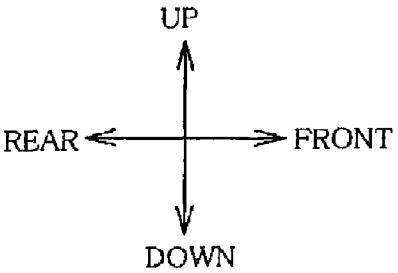
Figure 17:
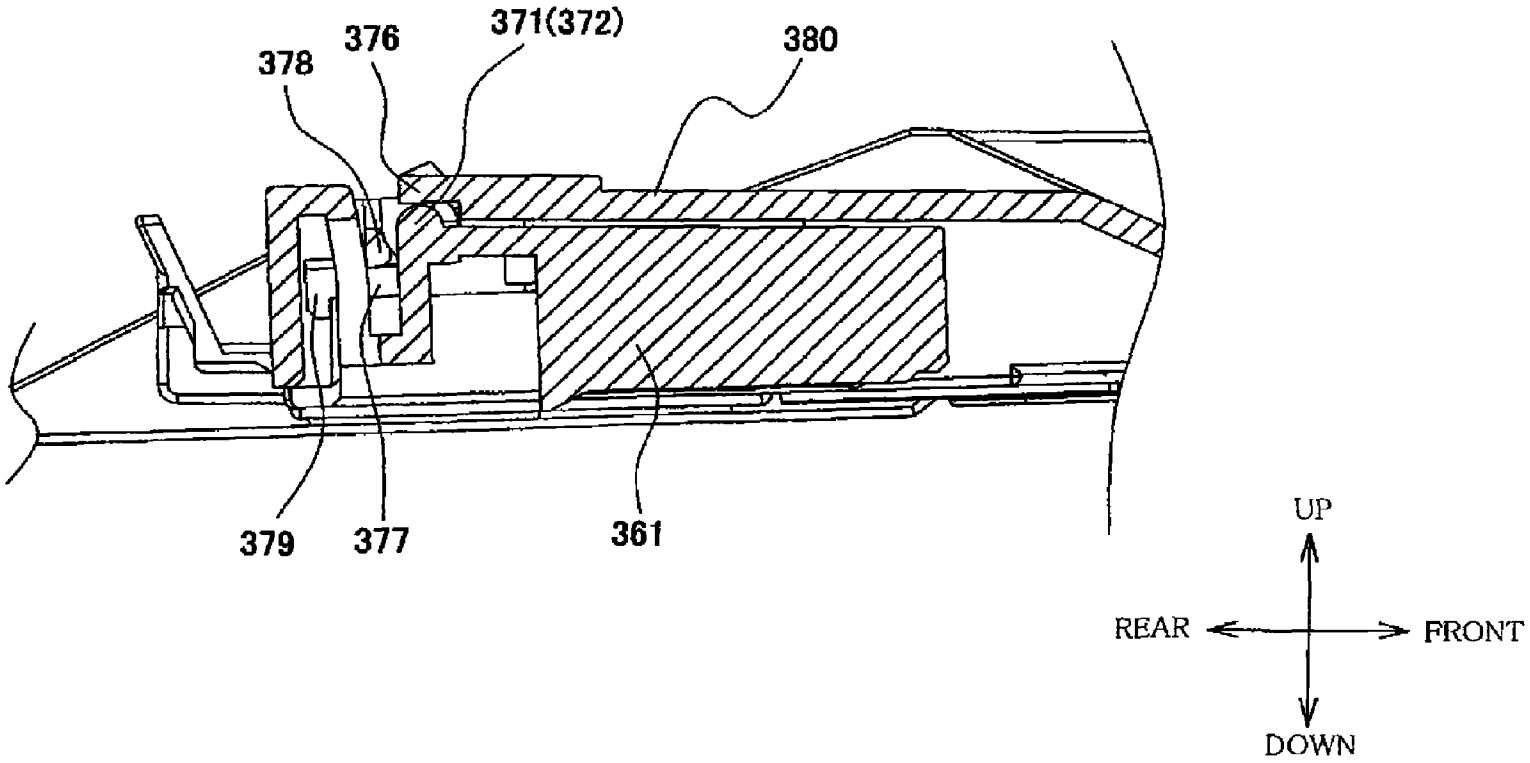
FIG. 17 is a cross sectional view of the support member 361 and the supported body 380 of the second tray 360, taken along line F-F of FIG. 14.

FIG. 14 is an upper plan view of the second tray 360. FIG. 15 is a cross sectional view of a support member 361 of the second tray 360, taken along line F-F of FIG. 14. FIG. 16 is a cross sectional view of a main body (supported body) 380 of the second tray 360, taken along line F-F of FIG. 14. FIG. 17 is a cross sectional view taken along line F-F of FIG. 14.

Figure 18:
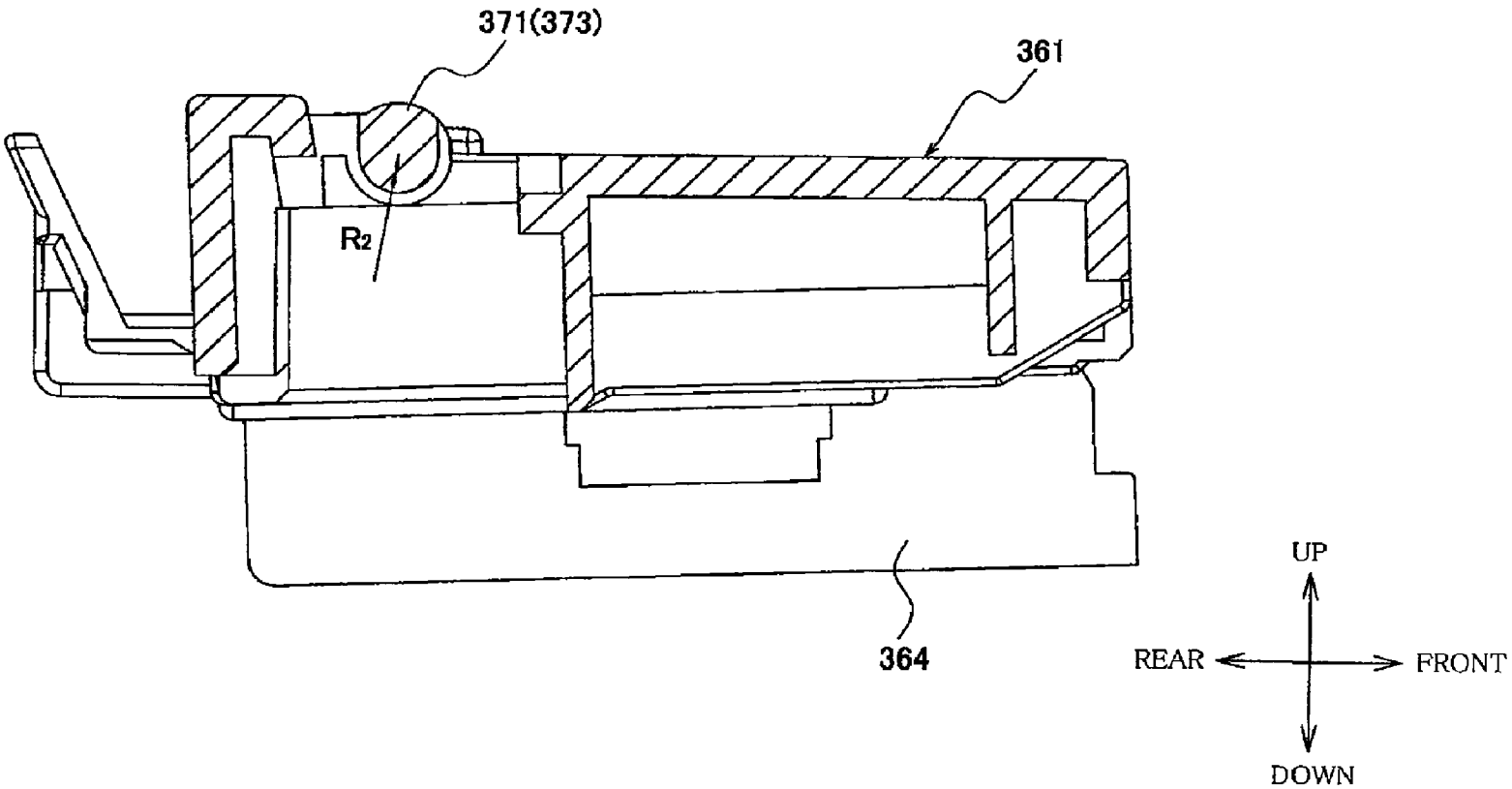
FIG. 18 is a cross sectional view of the support member 361 of the second tray 360, taken along line G-G of FIG. 14.
Figure 19:
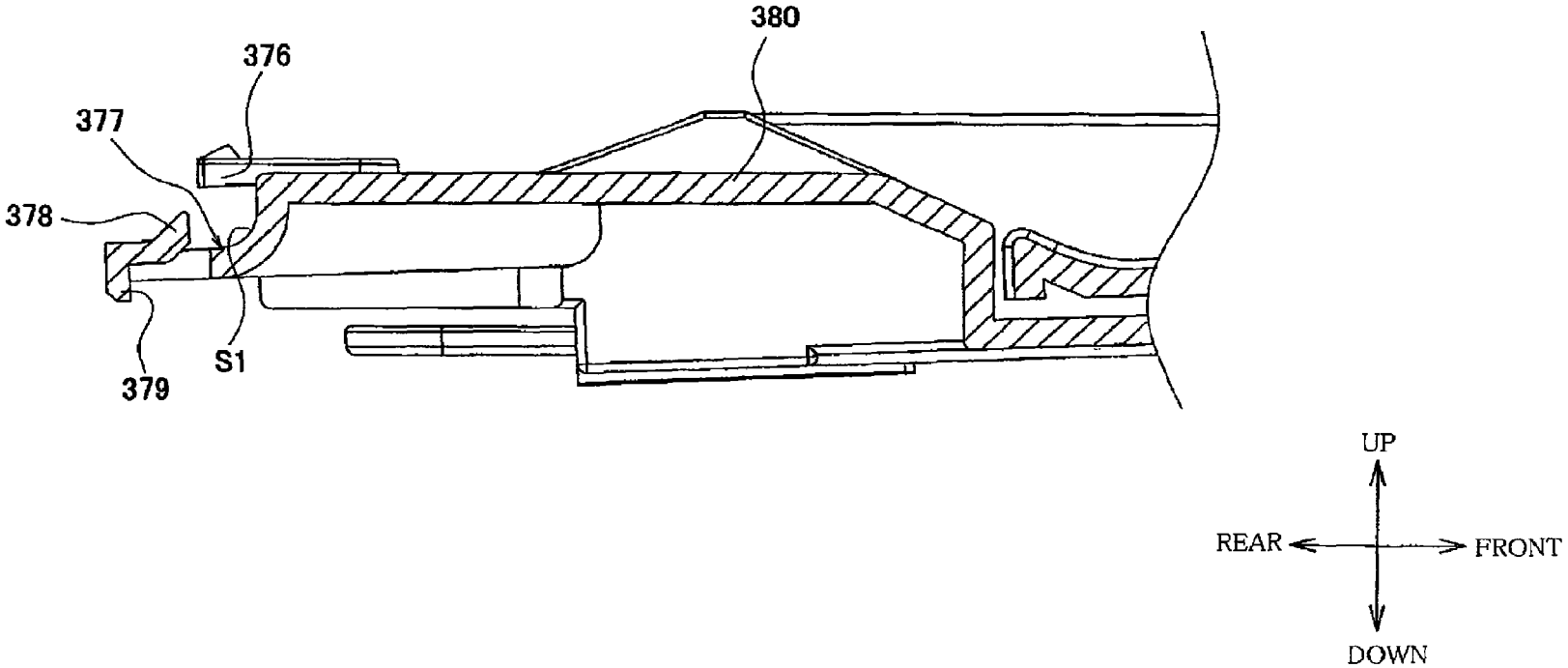
FIG. 19 is a cross sectional view of the supported body 380 of the second tray 360, taken along line G-G of FIG. 14.
Figure 20:
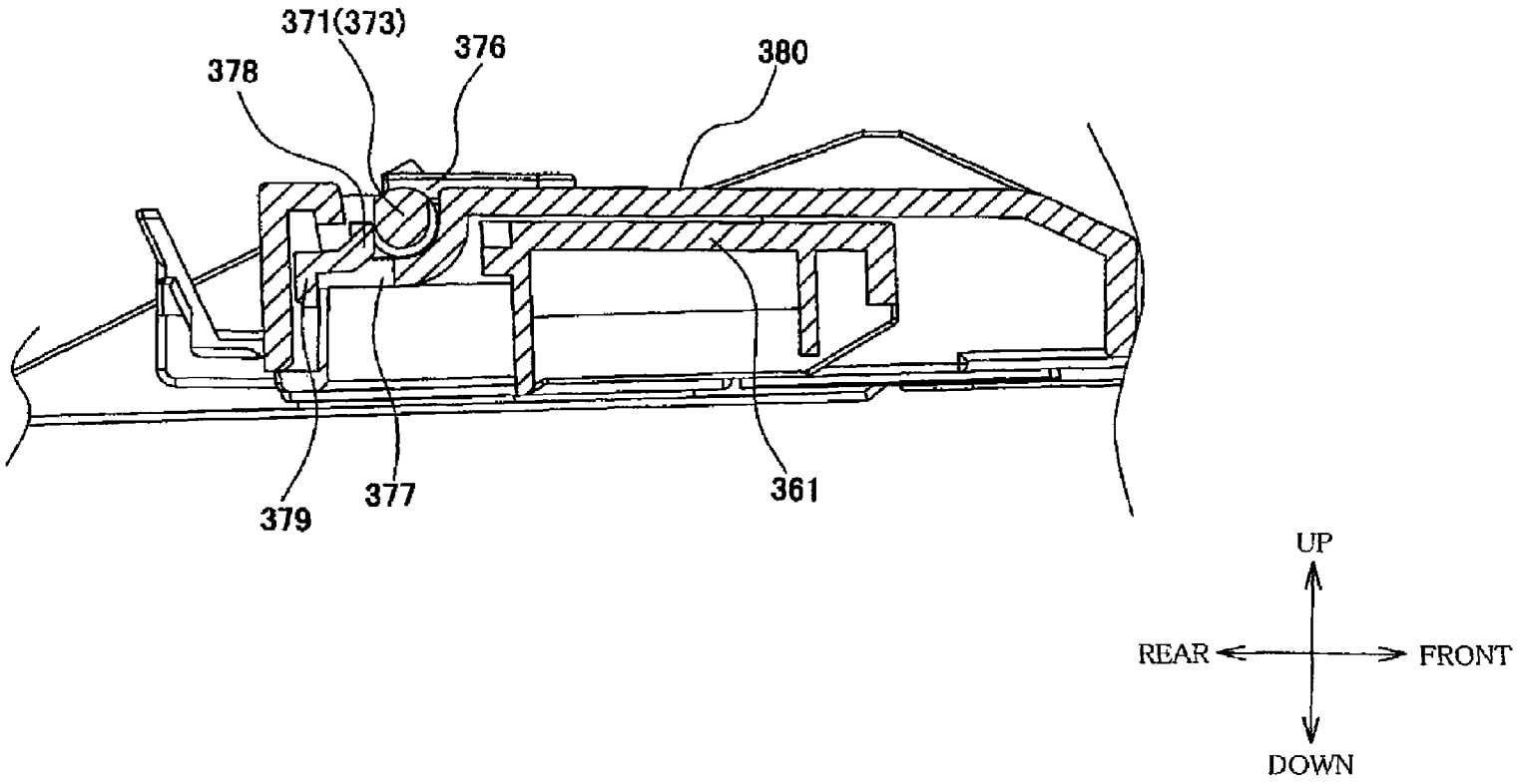
FIG. 20 is a cross sectional view of the support member 361 and the supported body 380 of the second tray 360, taken along line G-G of FIG. 14.
Figure 21:
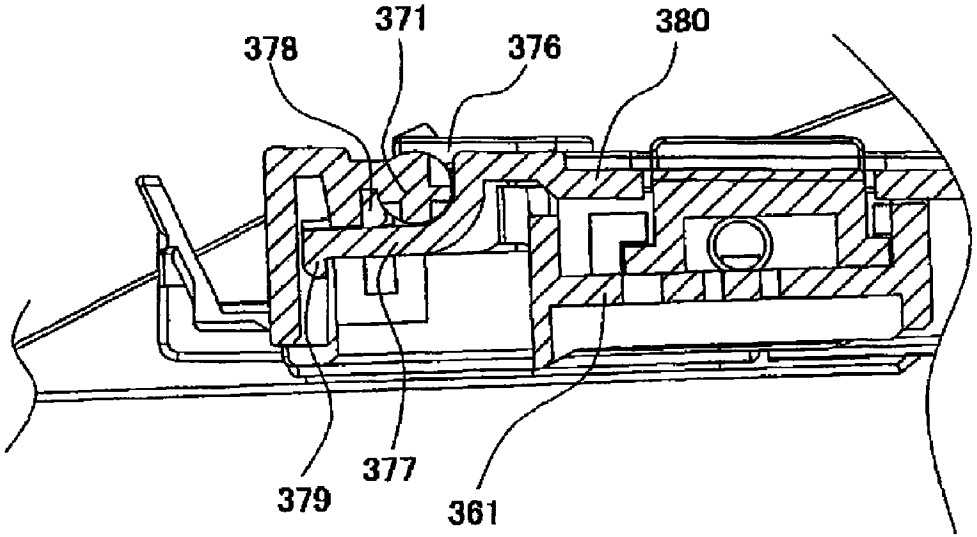
FIG. 21 is a cross sectional view of the support member 361 and the supported body 380 of the second tray 360, taken along line H-H of FIG. 14.
Figure 21:
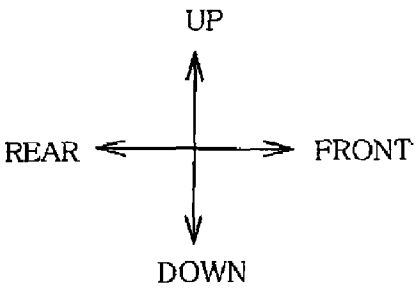
Figure 22:
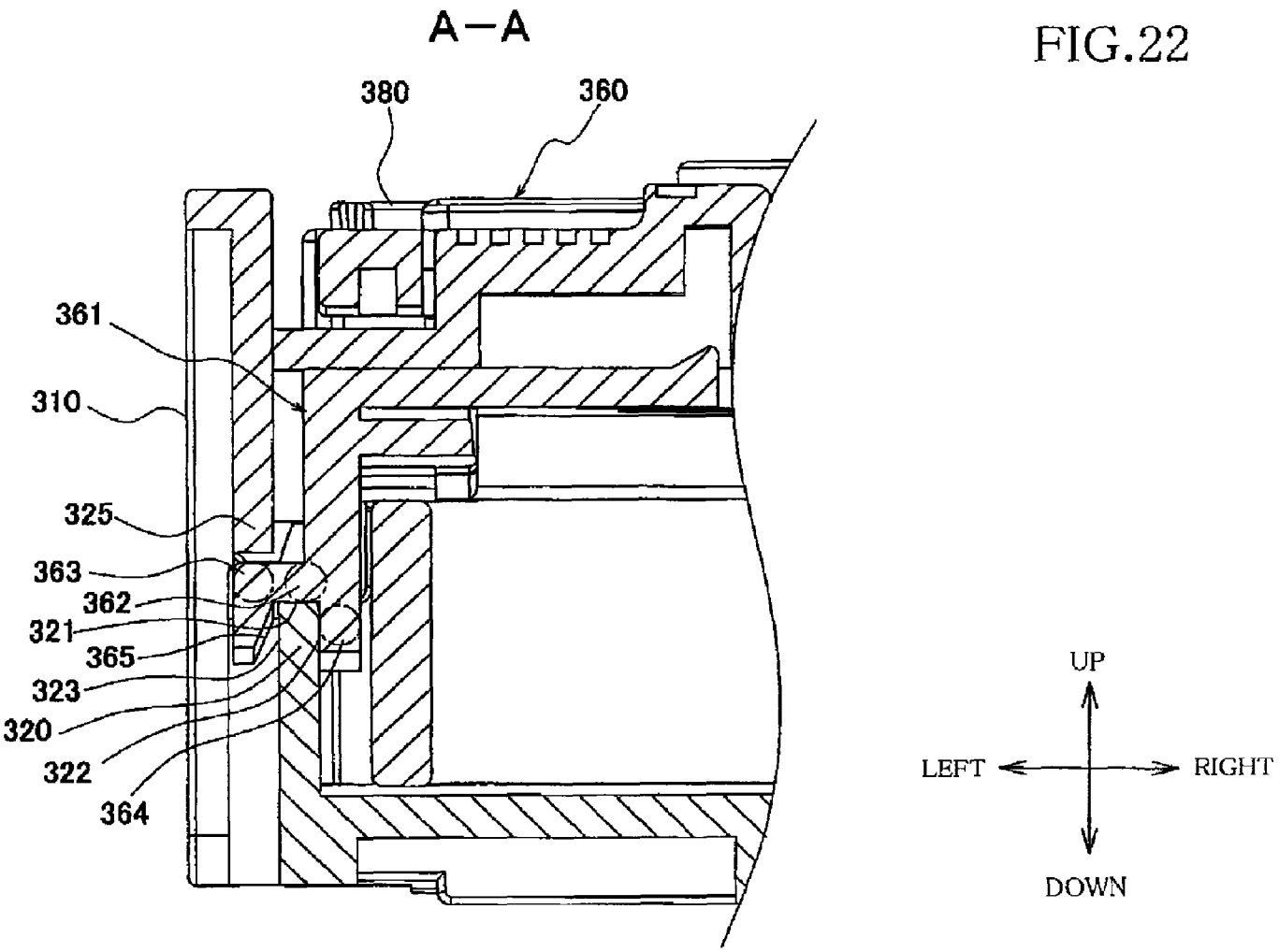
FIG. 22 is a cross sectional view taken along line A-A of FIG. 4.

FIG. 18 is a cross sectional view of the support member 361 of the second tray 360, taken along line G-G of FIG. 14. FIG. 19 is a cross sectional view of the main body 380 of the second tray 360, taken along line G-G of FIG. 14. FIG. 20 is a cross sectional view taken along line G-G of FIG. 14. FIG. 21 is a cross sectional view taken along line H-H of FIG. 14. FIG. 22 is a cross sectional view taken along line A-A of FIG. 4.

2.1. Basic Construction of Sheet Tray Device 300

The sheet tray device 300 is provided to hold or accommodate the media sheets that are to be supplied to the image forming unit 700. As shown in FIG. 3, the sheet tray device 300 includes the first tray 310 provided by a rectangular parallelepiped plate-like body that has an upper opening, the second tray 360 disposed on an upper side of the first tray 310 so as to cover a part of the upper opening of the first tray 310, and the extension tray 350 movably attached to the first tray 310. The extension tray 350 is movable relative to the first tray 310 in forward and rearward directions that are parallel to tray-device introduction and removal directions in which the sheet tray device 300 is introducible into and removable from the casing body 120 of the image forming apparatus 100.

2.2. Construction of First Tray 310

As shown FIG. 13, the first tray 310 is provided by the thin plate-like body having the rectangular parallelepiped shape. In the present embodiment, the first tray 310 has a size which permits A4-sized papers to be accommodated therein as maximum-sized media sheets when the extension tray 350 is not drawn out thereof, and which permits legal-sized papers to be accommodated therein as maximum-sized media sheets when the extension tray 350 is drawn out thereof.

The first tray 310 includes a bottom portion 311 (hereinafter referred to as bottom wall 311), and opposite side walls 312 which are located on respective end portions (i.e., right and left end portions in the present embodiments) of the first tray 310 that are opposite to each other in a horizontal direction perpendicular to the above-described tray-device introduction and removal directions. The opposite side walls 312 project upwardly from the bottom wall 311, and is elongated in the tray-device introduction and removal directions. In the present embodiment, the opposite side walls 312 and the bottom wall 311 are integrally formed of a resin.

A pair of guide members 313 are provided in the bottom wall 311 of the first tray 310, and are arranged to be movable in respective opposite directions that are parallel to a lateral direction of the sheet tray device 300 in which the opposite side walls 312 are opposed to each other (i.e., in respective opposite directions corresponding to right and left directions in the present embodiment). The pair of guide members 313 are movable together with each other in respective opposite directions, so that a center between the guide members 313 always lies in a constant position (i.e., in a laterally central portion of the sheet tray device 300 in the present embodiment), irrespective of positions of the guide members 313.

As shown in FIG. 13, each of the guide members 313 includes a bottom plate portion 314 on which the media sheets are to be mounted, a side plate portion 315 which extends vertically upwardly from a laterally outer end of the bottom plate portion 314, and a linear guide bar portion 316 which extends from a bottom surface of the bottom plate portion 314 toward the other of the guide members 313.

The linear guide bar portions 316 of the respective guide members 313 are in parallel to each other and are spaced apart from each other in a longitudinal direction of the sheet tray device 300 (corresponding to the sheet feed direction), and are slidably fitted in respective grooves 317 that are formed in the bottom wall 311 of the first tray 310 and extend in the lateral direction. Each of the linear guide bar portions 316 has teeth (not shown) formed in its surface opposed to a surface of the other of the linear guide bar portions 316, so as to serve as a rack.

The linear guide bar portions 316, which serve as the racks, mesh with a pinion (not shown) that is rotatably disposed in a laterally central portion of the bottom wall 311. Thus, the pair of guide members 313 are mechanically connected to each other through the pinion, so as to be slidable or movable in the respective opposite directions such that the center between the guide members 313 always lies in the constant position.

The side plate portion 315 of each of the guide members 313 has a contact surface that is to be in contact with a corresponding one of widthwise opposite ends of each media sheet. The contact surface of the side plate portion 315 is provided by a flat surface that is parallel to the longitudinal direction of the sheet tray device 300. Thus, each media sheet is fed to the sheet feed path L to be supplied to the image forming unit 700 while widthwise opposite ends of each media sheet are being positioned by the guide members 313.

The first tray 310 further includes a slant plate portion 318 that is provided in its rear end portion, i.e., its lower stream end portion as viewed in the sheet feed direction. The slant plate portion 318 is inclined for converting the feed direction of the media sheet (that is given a feed force by the sheet supplying unit 500) into an upward direction. A separator 319 is provided in a laterally central portion of the slant plate portion 318.

The separator 319 is constituted by a plurality of metallic protrusions which are vertically arranged at a certain pitch and which slightly protrude from a front surface of the slant plate portion 318. Owing to the separator 319, when the media sheets are pressed onto the slant plate portion 318 by the sheet supplying unit 500, the media sheets are brought into contact at their leading ends with distal ends of the respective protrusions of the separator 319. In this instance, the media sheet brought into contact with the protrusions of the separator 319 receive resistance acting against their feed movements, and an uppermost one of the media sheets is separated from the other media sheets so as to be moved toward the image forming unit 700. Thus, the media sheets are supplied, one after another, to the image forming unit 700.

Each of the opposite side walls 312 of the first tray 310 includes first and second rail portions 320, 325 that are provided in its portion close to the slant plate portion 318, as shown in FIG. 8, for movably supporting the second tray 360. The first and second rail portions 320, 325 extend in a rail extending direction (i.e., the longitudinal direction of the sheet tray device 300) in which the second tray 360 is movable relative to the first tray 310, as shown in FIG. 8. The second rail portion 325 is located on an upper side of the first rail portion 320, and is spaced apart from the first rail portion 320 in a vertical direction (that is perpendicular to the lateral direction and the rail extending direction). The first and second rail portions 320, 325 are offset from each other in the lateral direction, and do not overlap with each other as seen in the vertical direction.

Since the first and second rail portions 320, 325 do not overlap with each other as seen in the vertical direction, an upper portion of each side wall 312 located on an upper side of an upper end of the first rail portion 320 and a lower portion of each side wall 312 located on a lower side of a lower end of the second rail portion 325 are separated from each other.

Therefore, where the opposite side walls 312 (each including the first and second rail portions 320, 325) and the bottom wall 311 are to be integrally formed of a resin in an injection molding using upper and lower mold halves, there is a risk that it is impossible to form a portion of each side wall 312 interconnecting the above-described upper and lower portions of the side wall 312.

In the present embodiment, for solving such an inconvenience, each of the opposite side walls 312 of the first tray 310 further includes a plurality of interconnecting portions 329 which interconnect the first and second rail portions 320, 325, as shown in FIG. 8. The interconnecting portions 329 are spaced apart from each other in the longitudinal direction of the sheet tray device 300, and are disposed in a region L1 of each side wall 312 throughout which the first rail portion 320 extends in the longitudinal direction. This region L1 of each side wall 312 corresponds to a range L1 within which the second tray 360 (support member 361) is movable relative to the first tray 310.

Each of the interconnecting portions 329 includes a portion which bridges the upper and lower portions of the side wall 312 and which is located on a laterally outside of the second rail portion 325, as shown in FIG. 5, so as to interconnect the first and second rail portions 320, 325.

The extension tray 350 is attached to the first tray 310, movably relative to the first tray 310 in the rail extending direction (i.e., the longitudinal direction of the sheet tray device 300), as shown in FIGS. 7 and 13. The extension tray 350 can be drawn out of the first tray 310, by moving the extension tray 350 in the forward direction relative to the first tray 310. The extension tray 350 can be introduced into the first tray 310, by moving the extension tray 350 in the rearward direction relative to the first tray 310. The extension tray 350 has opposite side walls 351 each of which is slidably accommodated in a sheath-shaped accommodating portion 330 of a corresponding one of the opposite side walls 312 of the first tray 310. The accommodating portion 330 is provided by a front region L2 of each side wall 312.

Each of the opposite side walls 312 of the first tray 310 has a cutout 332, as shown in FIGS. 9 and 13, which is provided for facilitating an operation to move the guide members 313. The cutout 332 is located between the above-described regions L1, L2 as viewed in the rail extending direction. Specifically, the cutout 332 is located on a downstream side of the region L1 and on an upstream side of the region L2, as viewed in the sheet feed direction.

2.3. Construction of Second Tray 360

The second tray 360 is provided to accommodate the media sheets whose size is smaller than a size of the media sheets accommodated in the first tray 310. Specifically, the second tray 360 is designed to accommodate envelops or postal cards as the smaller-sized media sheets.

As shown in FIG. 7, the second tray 360 includes the support member 361 which extends in the lateral direction so as to bridge between the opposite side walls 312 of the first tray 310 and which is movable relative to the opposite side walls 312 in the rail extending direction, and the main body 380 pivotably supported by the support member 361. The second tray 360 further includes a hinge 370 through which the main body 380 is pivotable relative to the support member 361 so as to open and close the upper opening of the first tray 310.

2.3.1. Detailed Description of Second Tray 360

The support member 361 of the second tray 360 includes engaged portions at which the support member 361 is engaged with the opposite side walls 312 of the first tray 310. As shown in FIG. 22, each of the engaged portions of the support member 361 includes a main slide portion 362 that is slidably held in contact with an upper surface 321 of the first rail portion 320, a removal-preventing slide portion 363 that extends through a space between the first and second rail portions 320, 325 in a direction perpendicular to the rail extending direction (i.e., in the lateral direction of the sheet tray device 300 in the present embodiment) so as to prevent removal of the support member 361 of the second tray 360 from the first tray 310, and a rotation-preventing slide portion 364 that is slidably held in contact with an inside surface 322 of the first rail portion 320 so as to prevent rotation of the support member 361 of the second tray 360 relative to the first tray 310.

The support member 361 of the second tray 360 further includes an extending wall portion 365 which extends from the removal-preventing slide portion 363 and which is located on the side of an outside surface 323 of the first rail portion 320. The extending wall portion 365 cooperates with the rotation-preventing slide portion 364 to interpose the first rail portion 320 therebetween in the lateral direction. In the present embodiment, the extending wall portion 365 and the removal-preventing slide portion 363 are integrated with each other. The extending wall portion 365 has an opposed surface which is opposed to the first rail portion 325 in the lateral direction, and which is inclined such that a distance between the opposed surface and the first rail portion 320 increases in a downward direction away from the upper surface 321 of the first rail portion 320.

In the present embodiment, the removal-preventing slide portion 363 is formed integrally with the main slide portion 362, and extends from the main slide portion 362 in a laterally outward direction, i.e., in a leftward direction as seen in FIG. 22. The extending wall portion 365 is formed integrally with the main slide portion 362, and projects downwardly from a distal end of the removal-preventing slide portion 363. The rotation-preventing slide portion 364 is formed integrally with the main slide portion 362, and projects downwardly from a proximal end of the main slide portion 362.

As shown in FIG. 9, the rotation-preventing slide portion 364 of the support member 361 has a length D1 as measured in the rail extending direction, while the support member 362 as a whole has a length D2 as measured in the rail extending direction, such that the length D1 and the length D2 are substantially equal to each other.

The above-described region or range L1, within which the support member 361 of the second tray 360 is movable relative to the first tray 310, is determined such that the support member 361 is positioned in a position that is distant from an operational region of the sheet supplying unit 500 when the media sheets accommodated in the first tray 310 are supplied to the image forming unit 700 by the sheet supplying unit 500, as shown in FIG. 11.

On the other hand, when the media sheets accommodated in the second tray 360 are supplied to the image forming unit 700 by the sheet supplying unit 500, as shown in FIG. 12, the support member 361 is positioned in the vicinity of the sheet supplying unit 500.

2.3.2. Detailed Description of Hinge 370

As shown in FIGS. 15 and 18, the hinge 370 includes a shaft portion 371 which is provided in the support member 361, and first and second bearing portions 376, 377 which are provided in the main body 380 and which cooperate with each other to support the shaft portion 371. The first and second bearing portions 376, 377 are rotatably held in contact with an outer circumferential surface of the shaft portion 371.

As shown in FIGS. 17 and 20, the first and second bearing portions 376, 377 are located on respective opposite sides of the shaft portion 371 in a diametrical direction of the shaft portion 371. In the present embodiment, the first bearing portions 376 are located on an upper side of the shaft portion 371 (see FIG. 17) while the second bearing portions 377 are located on a lower side of the shaft portion 371 (see FIG. 20).

The first and second bearing portion 376, 377 are offset from each other in an axial direction of the shaft portion 371, such that each first bearing portion 376 is located between two second bearing portions 377 in an axial direction of the shaft portion 371.

The shaft portion 371 includes a small diameter portion 372 having a radius R1 (see FIG. 15) and a large diameter portion 373 having a radius R2 (see FIG. 18) that is smaller than the radius R1. The small diameter portion 372 and the large diameter portion 373 are arranged to be contactable with the first bearing portion 376 and the second bearing portion 377, respectively.

In the present embodiment, the first diameter portion 372 and the second diameter portion 373 are arranged to be coaxial with each other. The small diameter portion 372 has an axial length D3 that is smaller than an axial length D4 of the large diameter portion 373, as shown in FIG. 14.

Further, the small diameter portion 372 and the large diameter portion 373 are not completely circular in cross section. Rather, the small diameter portion 372 has an arcuate cross section only in its upper portion that is contactable with the first bearing portion 376 (see FIG. 15), while the large diameter portion 373 has an arcuate cross section only in its lower portion that is contactable with the second bearing portion 377 (see FIG. 18).

The hinge 370 further includes a removal preventer portion 378 that is provided in the second bearing portion 377 so as to prevent removal of the shaft portion 371 from the first and second bearing portions 376, 377, as shown in FIGS. 16 and 19. Specifically, the removal preventer portion 378 is located between the first and second bearing portions 376, 377 in a circumferential direction of the shaft portion 371, for preventing removal of the shaft portion 371 through a space between the first and second bearing portions 376, 377 in the circumferential direction. The removal preventer portion 378 is provided by a projecting portion of the main body 380 of the second tray 360, and projects from a surface contiguous to a sliding contact surface S1 of the second bearing portion 377 at which the second bearing portion 377 is to be contact with the shaft portion 371.

In the present embodiment, a front surface of the removal preventer portion 378, which faces the shaft portion 371 to be contactable with the shaft portion 371, is substantially perpendicular to the above-described surface contiguous to the sliding contact surface S1, while a rear surface of the removal preventer portion 378 is inclined with respect to the front surface of the removal preventer portion 378 such that a cross section of the removal preventer portion 378 reduces in an upward direction toward a distal end of the removal preventer portion 378, as shown in FIGS. 16 and 19.

The inclination of the rear surface of the removal preventer portion 378 facilitates an operation to attach the main body 380 to the support member 361, since the above-described inclined rear surface of the removal preventer portion 378 serves as a guide surface so as to cause the removal preventer portion 378 to be elastically deformed upon introduction of the shaft portion 371 into a space surrounded by the first and second bearing portions 376, 377.

In an assembled state in which the shaft portion 371 is introduced into the space surrounded by the first and second bearing portions 376, 377, as shown in FIGS. 17, 19 and 20, the first and second bearing portions 376, 377 are located on respective opposite sides of the shaft portion 371 in a diametrical direction of the shaft portion 371, while the removal preventer portion 378 and an end face of the main body 380 of the second tray 360 (that is close to proximal ends of the first and second bearing portions 376, 377) are located on respective opposite sides of the shaft portion 371 in another diametrical direction that is perpendicular to the above-described diametrical direction.

The hinge 370 further includes a stopper portion 379 that is provided in the second bearing portion 377, so as to define a maximum angle by which the main body 380 of the second tray 360 is pivotable relative to the first tray 310. The stopper portion 379 projects from one of opposite side surfaces of a distal end portion of the second bearing portion 377 (which one is remote from the removal preventer portion 378), and is to be brought into contact with a part of the support member 361 so as to limit a pivot motion of the main body 380 of the second tray 360 in a direction away from the first tray 310.

3. Construction of Sheet Supplying Unit 500

Figure 23:
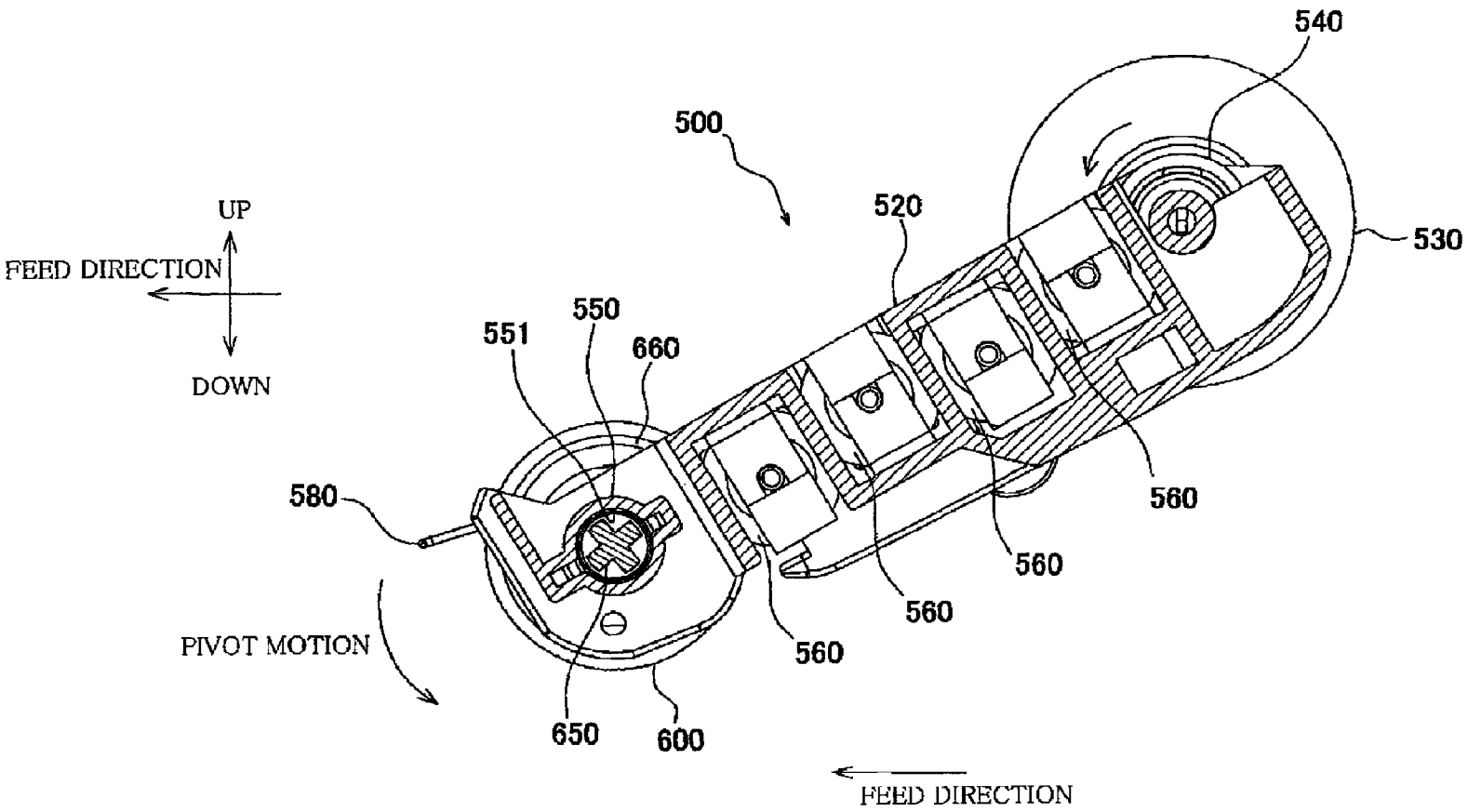
FIG. 23 is a cross sectional view of the sheet supplying unit 500.
Figure 24A:
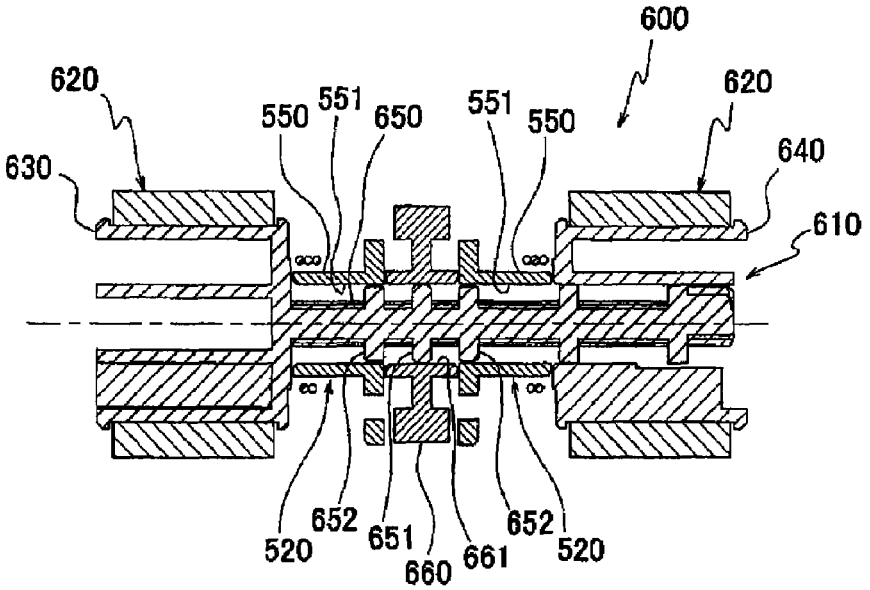
FIG. 24A is a view showing a state in which a sheet supplying roller 600 (rotary shaft 650) is in parallel with axes of through-holes 551 of respective shaft supporting portions 550.
Figure 24B:
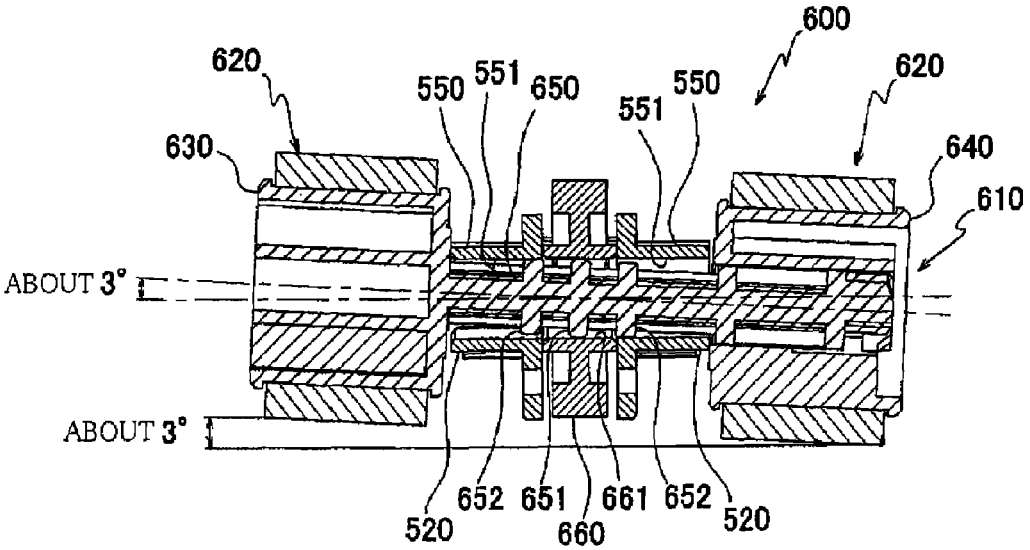
FIG. 24B is a view showing another state in which the sheet supplying roller 600 (rotary shaft 650) is inclined with respect to the axes of the through-holes 551 of the respective shaft supporting portions 550.
Figure 25A:
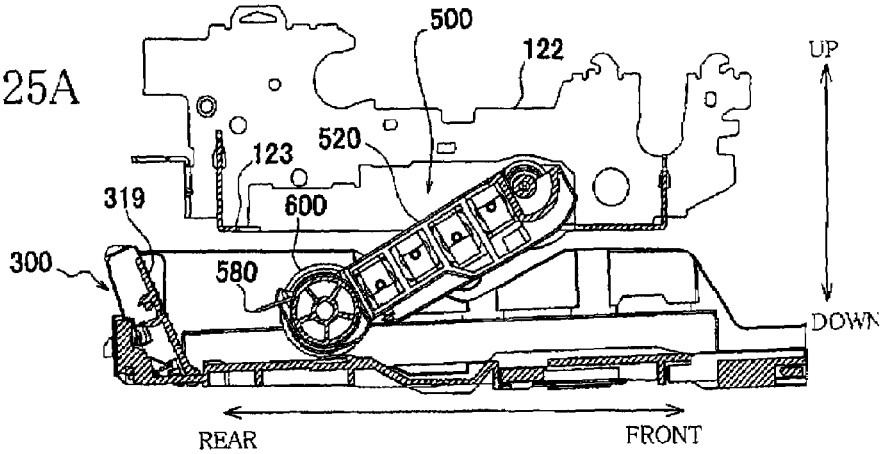
FIGS. 25A-25C are views showing an operation of a second coil spring 580.
Figure 25B:
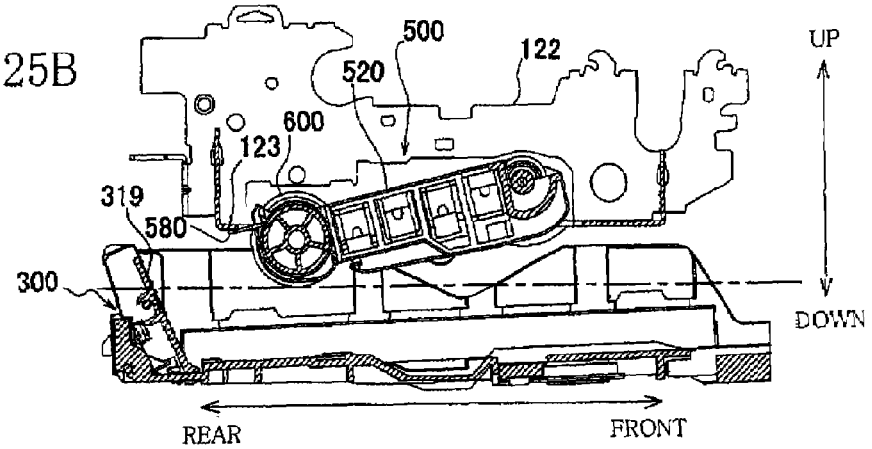
Figure 25C:
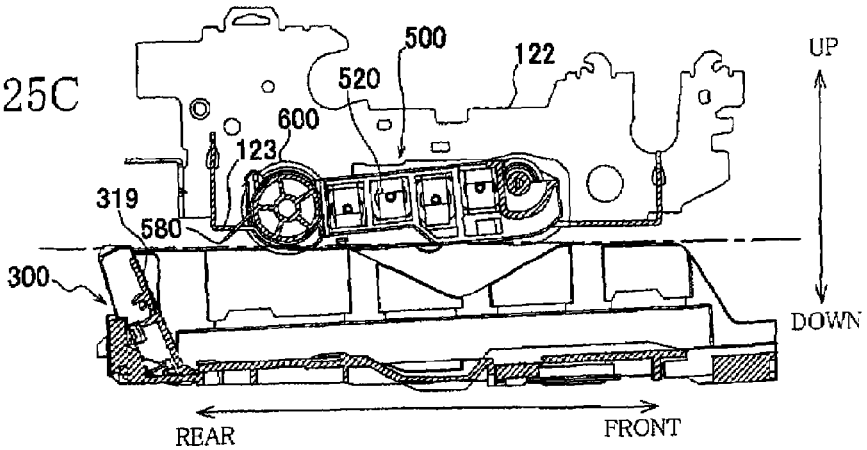

FIG. 23 is a cross sectional view of the sheet supplying unit 500. FIGS. 24A and 24B are cross sectional views of the sheet supplying roller 600, wherein FIG. 24A shows a state in which a rotary shaft 650 of the sheet supplying roller 600 is in parallel with axes of through-holes 551 of respective shaft supporting portions 550 (which are aligned with each other), while FIG. 24B shows another state in which the rotary shaft 650 of the sheet supplying roller 600 is inclined with respect to the axes of the through-holes 551. FIGS. 25A-25C are views showing an operation of a second coil spring 580.

The sheet supplying unit 500 is a mechanism that is arranged to apply the feed force to the media sheets accommodated in the first and second trays 310, 360 of the sheet tray device 300 so as to feed or supply the media sheets to the image forming unit 700. As shown in FIG. 3, the sheet supplying unit 500 is rockably or pivotably supported by a support shaft 510 which is located on an upper side of the sheet tray device 300 and which extends from a laterally central portion of the casing body 120 of the image forming apparatus 100 toward one of laterally opposite ends of the casing body 120 (toward a right end of the casing body 120 in the present embodiment).

The support shaft 510 is held by a metal frame 122 (see FIG. 2). A component of an external force exerted to the support shaft 510, which component acts in a radial direction of the support shaft 510, is received primarily by the metal frame 122. Meanwhile, the support shaft 510 primarily transmits or receives a torque acting on the support shaft 510.

A large gear 530 is mounted on one of axially opposite end portions of the support shaft 510 (that corresponds to a right end of the sheet tray device 300 in the present embodiment), so as to transmit a rotational force (generated by a drive source) to the support shaft 510. A small gear 540 (see FIG. 23) is mounted on the other of the axially opposite end portions of the support shaft 510 (that corresponds to a laterally central portion of the sheet tray device 300 in the present embodiment), so as to be rotated integrally with the support shaft 510.

A roller arm 520 is provided by a member which is rotatably attached to the support shaft 510 and which extends in a radial direction of the support shaft 510. The sheet supplying roller 600, which is rotatable about an axis of the rotary shaft 650, is held by a distal end portion of the roller arm 520 (see FIG. 24). In this arrangement, when the roller arm 520 is pivoted about an axis of the support shaft 510 in a direction toward the bottom wall 311 of the first tray 310, i.e., toward the media sheets, the sheet supplying roller 600 is pressed against the media sheets, namely, there is generated a pressing force forcing the sheet supplying roller 600 onto the media sheets.

The sheet supplying roller 600 is rotated while being held in contact with an uppermost one of the media sheets stacked in the sheet tray device 300, so as to apply the feed force to the uppermost one of the media sheets. As shown in FIG. 24, the sheet supplying roller 600 includes a cylindrical main body 610 and a pair of roller members 620 that are mounted on respective axially opposite end portions of the main body 610.

In the present embodiment, the cylindrical main body 610 is made of a hard synthetic resin, while each of the roller members 620 is made of a rubber or the like which is elastically deformable and which has a high coefficient of friction. The cylindrical main body 610 includes a pair of roller supporting portions 630, 640 on which the respective roller members 620 are mounted, a gear contact portion 651 provided in an axially central portion of the rotary shaft 650 that interconnects the roller supporting portions 630, 640, and a pair of arm contact portions 652 provided in respective portions of the rotary shaft 650 that are located on respective opposite sides of the axially central portion of the rotary shaft 650.

The rotary shaft 650 has a generally cross shape in its transversal cross section, as shown in FIG. 23. The gear contact portion 651 is provided by a cylindrical portion and protruding portions, wherein the cylindrical portion has a diameter that is larger than a maximum size of the rotary shaft 650 while the protrusion portions protrude radially outwardly from respective diametrically opposite ends of the cylindrical portion. Each of the arm contact portions 652 is provided by a cylindrical portion having a diameter that is larger than the maximum size of the rotary shaft 650.

The shaft support portions 550 are provided by the distal end portion of the roller arm 520, and define the respective through-holes 551, as shown in FIGS. 24A and 24B. The rotary shaft 650 is introduced in the through-holes 551 that are coaxial with each other, so as to be rotatably held by the shaft support portions 550.

Each of the arm contact portions 652, which are located on respective opposite sides of the gear contact portion 651, is slidably contacted at its outer circumferential surface with an inner circumferential surface of a corresponding one of the through-holes 551, so that the rotary shaft 650 is rotatably held by the shaft support portions 550. Since the diameter of the arm contact portions 652 is slightly smaller than an inside diameter of the through-holes 551, the rotary shaft 650 is rotatable even in the state, as shown in FIG. 24B, in which the rotary shaft 650 is inclined with respect to the axes of the through-holes 551.

A gear 660 is provided between the two shaft support portions 550 of the roller arm 520, rotatably relative to the roller arm 520, so as to transmit a drive force to the sheet supplying roller 600 (rotary shaft 650). The gear contact portion 651 is located within a through-hole 661 that is formed through an axis of the gear 660 (about which the gear 660 is rotatable).

In an inner circumferential surface of the through-hole 661, fan-shaped grooves are formed to receive therein the above-described protruding portions of the gear contact portion 651. That is, the gear contact portion 651 is fitted at its protruding portions in the grooves of the inner circumferential surface of the through-hole 661, so that the gear 660 and the gear contact portion 651 are held in engagement with each other.

In the present embodiment, a length of each of the fan-shaped grooves as measured in a circumferential direction of the through-hole 661 is larger than a length of a corresponding one of the protruding portions of the gear contact portion 651 as measured in a circumferential direction of the gear contact portion 651, so that there is a play between each fan-shaped groove and the corresponding protruding portion, which allows the gear 660 to be rotated relative to the gear contact portion 651 by a predetermined degree of angle (by about 60° in the present embodiment).

The roller arm 520 has a plurality of intermediate gears 560 incorporated therein to transmit the drive force from the small gear 540 (fixed to the support shaft 510) to the gear 660. The intermediate gears 560 are arranged in a direction in which the roller arm 520 extends, as shown in FIG. 23.

The number of the intermediate gears 560 is determined such that a direction of tangent line between the sheet supplying roller 600 and an uppermost one of the stacked media sheets coincides with the feed direction of each of the media sheets when the roller arm 520 is pivoted in a direction causing its distal end portion to be displaced toward the media sheets (bottom wall 311) by rotating the support shaft 510 (small gear 540) in a direction indicated by arrow in FIG. 23.

As the drive force is applied to the sheet supplying roller 600, the feed force is given to the uppermost media sheet, while the roller arm 520 is forced by a reaction acting on the sheet supplying roller 600 to be pivoted toward the media sheet. Therefore, the feed force is reliably given to the media sheet from the sheet supplying roller 600 to which the drive force is applied, without separation of the sheet supplying roller 600 from the media sheet.

In the above-described arrangement in which the sheet supplying roller 600 is pressed onto the stacked media sheets by utilizing the reaction against the drive force that causes rotation of the sheet supplying roller 600, the pressing force (by which the roller 600 is pressed on the media sheets) is easily changeable, and is not generated, particularly, in a stage of initiation of feed of the media sheets in which the drive force is not yet applied to the sheet supplying roller 600.

In the present embodiment, as shown in FIG. 3, a first torsion coil spring 570 is disposed on the side of the support shaft 510 so as to constantly generate an elastic force that forces the roller arm 520 to be pivoted toward the media sheets, while the above-described second torsion coil spring 580 is disposed on the side of the distal end portion of the roller arm 520 so as to generate an elastic force that forces the roller arm 520 to be pivoted toward the media sheets.

The second torsion coil spring 680 is held in contact with a contact member 123 provided in the frame 122 so as to be elastically deformed, when an angle defined by the roller arm 520 and the uppermost media sheet is small, namely, when the roller arm 520 extends substantially in a horizontal direction, as shown FIGS. 25B and 25C. In this instance, the roller arm 520 is pressed (biased) toward the media sheets, owing to the elastic deformation of the second torsion coil spring 580. It is noted that the uppermost media sheet is represented by one-dot chain line in FIGS. 25B and 25C.

On the other hand, when the angle defined by the roller arm 520 and the uppermost media sheet is large, as shown in FIG. 25A, the second torsion coil spring 580 is separated from the contact member 123, so that the second torsion coil spring 580 does not generate the elastic force that forces the roller arm 520 toward the media sheets. That is, the second torsion coil spring 580 presses (biases) the roller arm 520 toward the media sheets, only when the roller arm 520 is substantially parallel to the horizontal direction.

4. Characteristics of Image Forming Apparatus

Figure 26A:
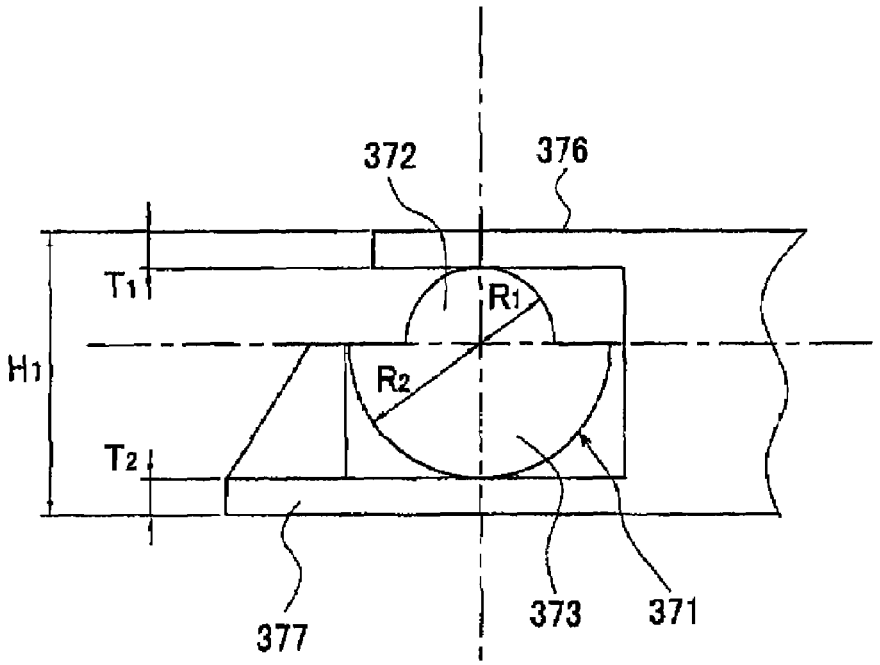
FIG. 26A is a view schematically showing a hinge 370 in the embodiment of the invention.
Figure 26B:
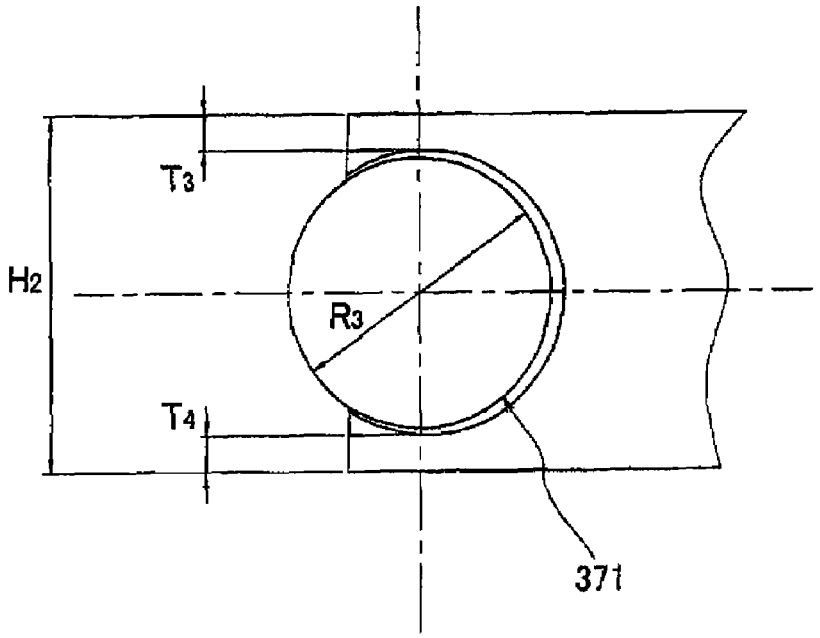
FIG. 26B is a view schematically showing a C-type hinge.

FIG. 26A is a view schematically showing the hinge 370 in the present embodiment of the invention. FIG. 26B is a view schematically showing a C-type hinge in which a shaft portion is fitted in a bearing portion that has a letter C shape.

As shown in FIG. 26A, the hinge 370 has a height or thickness H1 that is equal to a sum of a distance R1 between an axis of the small diameter portion 372 and the first bearing portion 376, a height or thickness T1 of the first bearing portion 376, a distance R2 between an axis of the large diameter portion 373 and the second bearing portion 377 and a height or thickness T2 of the second bearing portion 377.

On the other hand, as shown in FIG. 26B, the C-type hinge has a height or thickness H2 that is equal to a sum of a height or thickness T3 of a part of the bearing portion at which the bearing portion is in contact with one of diametrically opposite ends of the shaft portion 371, a height or thickness T4 of another part of the bearing portion at which the bearing portion is in contact with the other of the diametrically opposite ends of the shaft portion 371 and a diameter R3 of the shaft portion 371.

Therefore, the height or thickness H1 of the hinge 370 in the present embodiment is smaller than the height or thickness H2 of the C-type hinge, as long as a radius of the shaft portion 371 of the C-type hinge is equal to a radius of the large diameter portion 373 of the shaft portion 371 of the hinge 370 in the present embodiment, and a sum of the height or thickness T1 of the first bearing portion 376 and the height or thickness T2 of the second bearing portion 377 is equal to a sum of the height or thickness T3 of the part of the bearing portion at which the bearing portion is in contact with the above-described one of the diametrically opposite ends of the shaft portion 371 and the height or thickness T4 of the above-described another part of the bearing portion at which the bearing portion is in contact with the above-described other of the diametrically opposite ends of the shaft portion 371.

That is, H1=R1+R2+2×t and H2=2×R2+2×t, when T1=T2=T3=T4=t and R3=2×R2. Therefore, the height (thickness) H1 of the hinge 370 in the present embodiment is smaller than the height (thickness) H2 of the C-type hinge.

Further, in the present embodiment, the shaft portion 371 is interposed between the first and second bearing portions 376, 377, and is prevented by the removal preventer portion 378 from being removed from the first and second bearing portions 376, 377, whereby removal of the main body (supported body) 380 from the support member 361 is reliably prevented.

Therefore, in present embodiment, the hinge 370 can be made small in size whereby the sheet tray device 300 as a whole can be made compact in size, while the removal of the main body (supported body) 380 from the support member 361 is reliably prevented.

Since the radius R1 of the small diameter portion 372 is smaller than the radius R2 of the large diameter portion 373, the smaller diameter portion 372 has a rigidity smaller than that of the large diameter portion 373. In general, a portion having a smaller rigidity is likely to surfer from a fatigue fracture before a portion having a large rigidity suffers from it.

However, in the present embodiment, since the axial length D3 of the small diameter portion 372 is smaller than the axial length D4 of the large diameter portion 373, it is possible to prevent the fatigue fracture of the small diameter portion 372 from taking place before that of the large diameter portion 373.

Further, in the present embodiment, the hinge 370 includes the stopper portion 379 for defining the maximum angle by which the main body 380 of the second tray 360 is pivotable relative to the first tray 310. The provision of the stopper portion 379 is effective to prevent problems such as breakage of the hinge 370 (that could be caused if the main body 380 were pivoted by an excessively large angle) and removal of the main body 380 from the support member 361.

Further, in the present embodiment, the main slide portion 362 is slidably held in contact with the upper surface of the first rail portion 362, as shown in FIG. 22, whereby the support member 361 of the second tray 360 is movably held by the first tray 310.

Further, since the removal-preventing slide portion 363 extends through the space between the first and second rail portions 320, 325, removal of the support member 361 of the second tray 360 from the first tray 310 can be prevented by engagement of the removal-preventing slide portion 363 with at least one of the first and second rail portions 320, 325.

Moreover, since the rotation-preventing slide portion 364 is slidably held in contact with the inside surface 322 of the first rail portion 320, it is possible to prevent rotation of the second tray 360 relative to the first tray 310.

Therefore, in the sheet tray device 300 in the present embodiment, it is possible to avoid problems such as rotation of the second tray 360 relative to the first tray 310 and removal of the second tray 360 from the first tray 310, when the second tray 360 is moved relative to the first tray 310.

In the present embodiment, the first tray 310 including the opposite side walls 312 is a product that is formed of a resin according to a forming process (e.g., injection molding) using molds. Therefore, if the first and second rail portions 320, 325 were positioned relative to each other to overlap with each other as seen in the vertical direction, it would be necessary to use, in addition to the upper and lower mold halves, a core (insert) or a slide mold, for obtaining the space between the first and second rail portions 320, 325.

Thus, if the first and second rail portions 320, 325 were arranged to overlap with each other as seen in the vertical direction, the required cost for the mold assembly and the efficiency in the forming process would be increased and reduced, respectively, possibly resulting in a considerable increase in the cost of manufacturing the first tray 310 (sheet tray device 300).

In the present embodiment, the first and second rail portions 320, 325 are offset from each other in the lateral direction, and do not overlap with each other as seen in the vertical direction, thereby making it possible to obtain the space between the first and second rail portions 320, 325 in the forming process using the upper and lower mold halves without the core (insert) or slide mold.

It is therefore possible to avoid the increase in the required cost for the mold assembly and the reduction in the efficiency in the forming process, thereby preventing the increase in the cost of manufacturing the first tray 310 (sheet tray device 300).

However, in the arrangement in which the first and second rail portions 320, 325 are offset from each other in the lateral direction, the removal-preventing slide portion 363 are contactable, at its contact regions that are offset from each other in the lateral direction, with the respective first and second rail portions 320, 325. Since the contact regions of the removal-preventing slide portion 363 contactable with the respective first and second rail portions 320, 325 are offset from each other in the lateral direction, the removal-preventing slide portion 363 is likely to receive a bending moment such that the contact region contacted with the first rail portion 320 acts as a fulcrum while the contact region contacted with the second rail portion 325 acts as a point of action.

If the removal-preventing slide portion 363 is considerably deformed or bent as a result of application of the bending moment thereto, there is a risk that the removal-preventing slide portion 363 could be removed through the space between the first and second rail portions 320, 325, and accordingly the support member 361 could be removed from the first tray 310.

In the present embodiment, however, the extending wall portion 365 is provided to extend from the removal-preventing slide portion 363 such that the first rail portion 320 is located between the extending wall portion 365 and the rotation-preventing slide portion 364 in the lateral direction.

When the bending moment acts on the removal-preventing slide portion 363, the extending wall portion 365 is brought into contact with the outside surface 323 of the first rail portion 320, so as to serve as a stopper or restrainer for restraining deformation of the removal-preventing slide portion 363.

Therefore, even when the bending moment is applied to the removal-preventing slide portion 363, it is possible to prevent considerable deformation of the removal-preventing slide portion 363, and accordingly avoid removal of the removal-preventing slide portion 363 from through the space between the first and second rail portions 320, 325.

As is clear from the above description, in the present embodiment, it is possible to restrain increase in the cost required for manufacturing the sheet tray device 300 while preventing the support member 361 of the second tray 360 being removed from the first tray 310.

The above-described bending moment can be reduced with reduction in an amount of offset of the first and second rail portions 320, 325 from each other in the lateral direction in which the opposite side walls 312 are opposed to each other. However, the reduction in the offset amount makes it difficult to attach the support member 361 to the opposite side walls 312, since the extending wall portion 365 has to pass through the space between the first and second rail portions 320, 325 that is small in its cross section that is perpendicular to the vertical direction.

In view of such a difficulty, in the present embodiment, the opposed surface of the extending wall portion 365 (that is opposed to the first rail portion 325 in the lateral direction) is inclined with respect to the vertical direction such that the distance between the opposed surface and the first rail portion 320 increases in the downward direction away from the upper surface 321 of the first rail portion 320. The inclination of the opposed surface of the extending wall portion 365 facilitates an operation to cause the extending wall portion 365 to pass through the space between the first and second rail portions 320, 325, since the above-described inclined opposed surface of the extending wall portion 365 serves as a guide surface. Thus, the extending wall portion 365 can be easily caused to pass through the space between the first and second rail portions 320, 325, even where the above-described offset amount is small.

Therefore, without making it difficult to attach the support member 361 to the opposite side walls 312, it is possible to reliably prevent removal of the support member 361 from the first tray 310 due to the bending moment acting on the removal-preventing slide portion 363.

In the present embodiment, the cutout 332 is formed in a portion of each of the opposite side walls 312 that is located in a front side of the above-described region or range L1 within which the second tray 360 (support member 361) is movable relative to the first tray 310, so that the range of the movement of the second tray 360 is not limited by the presence of the cutout 332.

Further, the above-described region or range L1 is determined such that the support member 361 is positioned in the position that is distant from the operational region of the sheet supplying unit 500 when the media sheets accommodated in the first tray 310 are supplied to the image forming unit 700 by the sheet supplying unit 500, so that the sheet supplying unit 500 is prevented from being interfered by the support member 361.

While the presently preferred embodiment of the invention has been described above in detail, it is to be understood that the invention is not limited to the details of the illustrated embodiment, but may be otherwise embodied without departing from the spirit of the invention.

Figure 27:
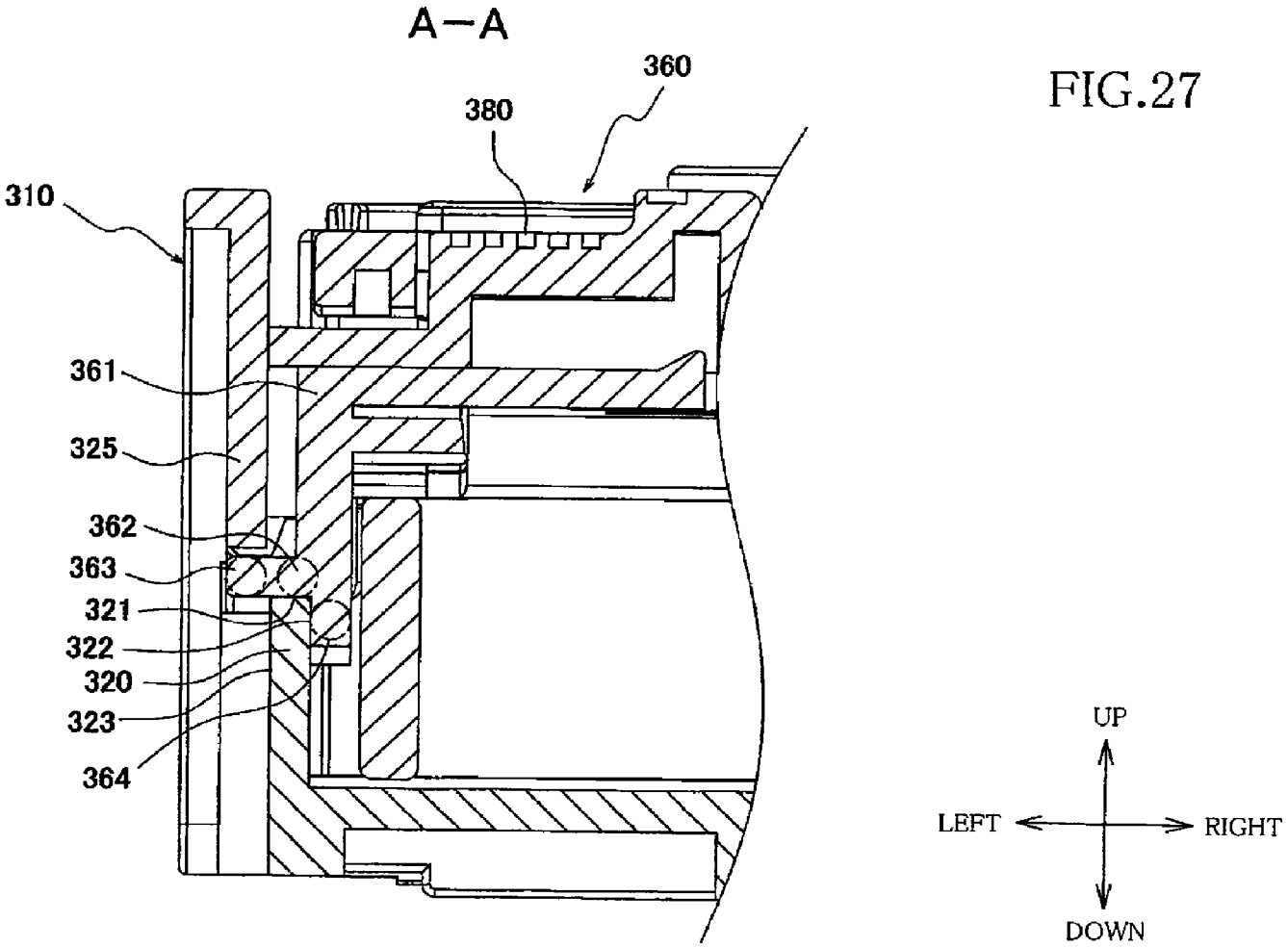
FIG. 27 is a view showing a modification of the support member 361 of the second tray 360.
Figure 28:
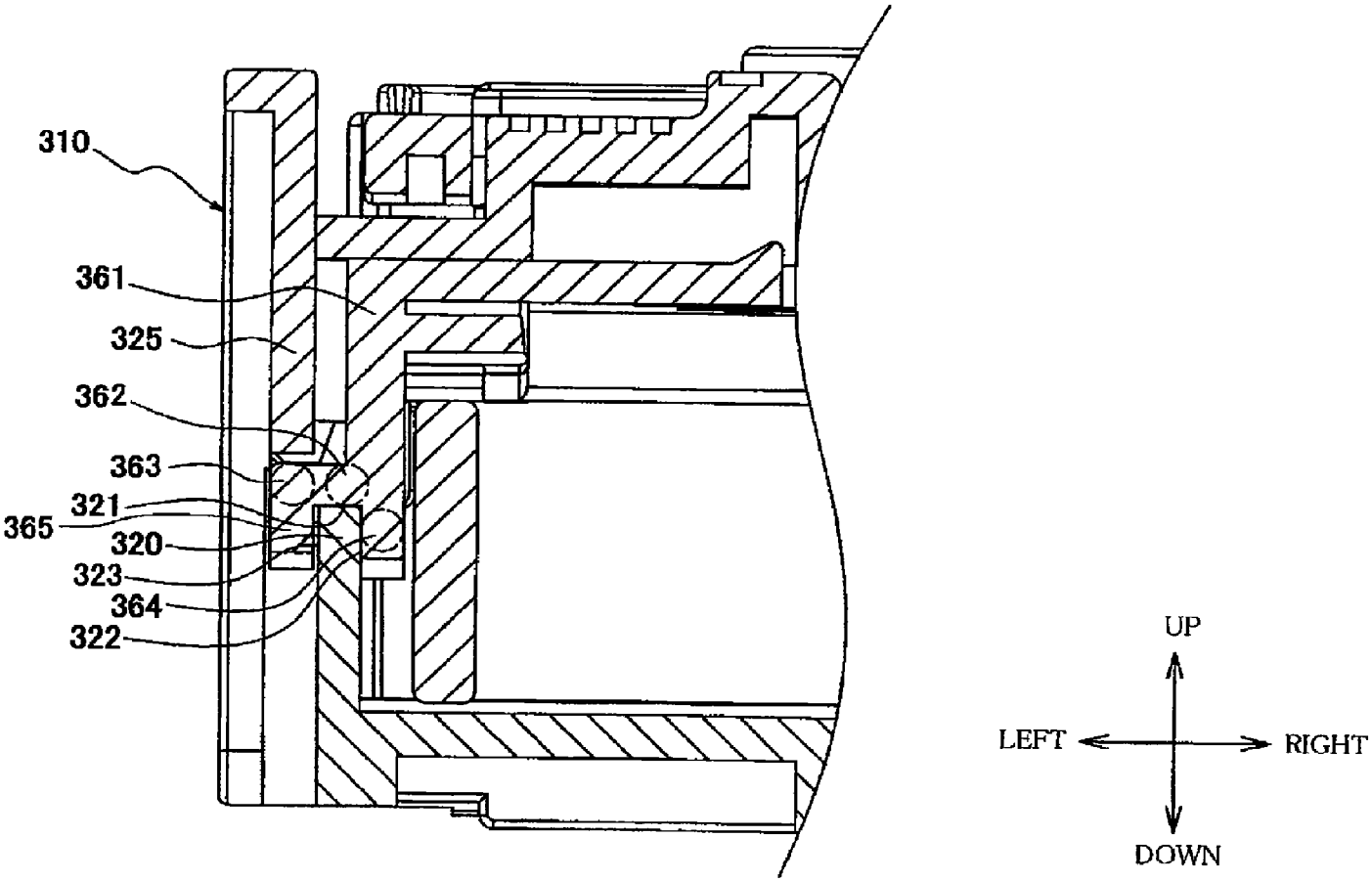
FIG. 28 is a view showing another modification of the support member 361 of the second tray 360.

For example, the arrangement for connection of the support member 361 with each of the opposite side walls 312 is not limited to details shown in FIG. 22, and may be modified as shown in FIG. 27 in which the extending wall portion 365 is not provided, or may be modified as shown in FIG. 28 in which the opposed surface of the extending wall portion 365 (opposed to the first rail portion 325) is not inclined with the respect to the vertical direction.

Further, in the above-described embodiment, the main slide portion 362, removal-preventing slide portion 363 and rotation-preventing slide portion 364 are located in substantially the same position in the rail extending direction, namely, these portions 362, 363, 364 can be represented by a single cross section perpendicular to the rail extending direction. However, these portions 362, 363, 364 may be offset from each other in the rail extending direction.

Further, while the first and second rail portions 320, 325 are offset from each other in the lateral direction in the above-described embodiment, the first and second rail portions 320, 325 does not necessarily have to be offset from each other but may overlap with each other as seen in the vertical direction.

In the above-described embodiment, the extending wall portion 365 is positioned outside the first rail portion 320 while the rotation-preventing slide portion 364 are positioned inside the first rail portion 320. However, the extending wall portion 365 and the rotation-preventing slide portion 364 may be positioned inside and outside the first rail portion 320, respectively.

While the axial length D3 of each small diameter portion 372 is smaller than the axial length D4 of each large diameter portion 373 in the present embodiment, the axial length D3 of the small diameter portion 372 may be equal to or larger than the axial length D4 of the large diameter portion 373.

While each small diameter portion 372 is located between two large diameter portions 373 in the above-described embodiment, each large diameter portion 373 may be located between two small diameter portions 372.

In the above-described embodiment, the small diameter portion 372 and the large diameter portion 373 are arranged to be contactable with the first and second bearing portions 376, 377, respectively. However, the portions 372, 373 may be arranged such that the small diameter portion 372 is contactable with the second bearing portion 377 while the large diameter portion 373 is contactable with the first bearing portion 376. Further, in the above-described embodiment, the first bearing portions 376 are located on the upper side of the shaft portion 371 while the second bearing portions 377 are located on the lower side of the shaft portion 371. However, the first bearing portions 376 are located on the lower side of the shaft portion 371 while the second bearing portions 377 are located on the upper side of the shaft portion 371.

In the above-described embodiment, the small diameter portion 372 has the arcuate cross section only in its upper portion that is contactable with the first bearing portion 376 (see FIG. 15), while the large diameter portion 373 has the arcuate cross section only in its lower portion that is contactable with the second bearing portion 377 (see FIG. 18). However, each of the small diameter portion 372 and the large diameter portion 373 may be completely circular in cross section.

In the above-described embodiment, the shaft portion 371 is provided in the support member 361 of the second tray 360 while the first and second bearing portions 376, 377 are provided in the main body 380 of the second tray 360. However, this arrangement may be modified such that the shaft portion 371 is provided in the main body 380 while the first and second bearing portions 376, 377 are provided in the support member 361.

In the above-described embodiment, the image forming unit 700 is of inkjet type. However, the invention is equally applicable to a case where the image forming unit 700 is of electrophotographic type.

What is claimed is:

1. A sheet tray device that is [removably] introduced into a main body of an image forming apparatus through an opening of the main body, so as to hold a media sheet that is to be supplied to an image forming unit of the image forming apparatus by which an image forming operation is performed on the media sheet, said sheet tray device comprising:

(a) a first tray accommodating a first size sheet as the media sheet, and having a bottom wall and opposite side walls that project upwardly from said bottom wall, such that at least said bottom wall and said opposite side walls are provided by a single piece; and (b) a second tray movably disposed on an upper side of said first tray and accommodating a second size sheet as the media sheet, [the second size sheet having a size smaller than a size of the first size sheet,]

wherein said second tray includes (b-1) a support member which bridges between said opposite side walls of said first tray and which is movable relative to said opposite side walls, and (b-2) a supported body pivotably supported by said support member so as to open and close an upper opening of said first tray, wherein [each] *at least one* of said opposite side walls of said first tray includes first and second rail portions that extend in a rail extending direction in which said support member is movable relative to said opposite side walls, said second rail portion being located on an upper side of said first rail portion and being spaced apart from said first rail portion, wherein said support member of said second tray includes (i) a main slide portion that is slidably held in contact with an upper surface of said first rail portion, (ii) a removal-preventing slide portion that extends through a space between said first and second rail portions so as to prevent removal of said support member of said second tray from said first tray, and (iii) a rotation-preventing slide portion that is slidably held in contact with a side surface of said first rail portion so as to prevent rotation of said support member of said second tray relative to said first tray, wherein said first and second rail portions are offset from each other in a lateral direction in which said opposite side walls of said first tray are opposed to each other, such that said first and second rail portions do not overlap with each other as seen in a vertical direction that is perpendicular to said lateral direction and said rail extending direction, wherein said support member of said second tray further includes (iv) an extending wall portion which extends from said removal-preventing slide portion, such that said first rail portion is located between said extending wall portion and said rotation-preventing slide portion in said lateral direction, wherein said rotation-preventing slide portion extends downwardly from said main slide portion, and is slidably held in contact with, as said side surface, one of opposite side surfaces of said first rail portion that is located on an inner side of the other of said opposite side surfaces in said lateral direction, wherein said removal-preventing slide portion extends outwardly from said main slide portion in said lateral direction, and wherein said extending wall portion extends downwardly from said removal-preventing slide portion, such that said extending wall portion, said removal-preventing slide portion, said main slide portion and said rotation-preventing slide portion cooperate with one another to define a generally inverted U shape in a cross-section thereof that is perpendicular to said rail extending direction.

2. The sheet tray device according to claim 1, wherein said extending wall portion has an opposed surface that is opposed to said first rail portion in said lateral direction, and wherein said opposed surface is inclined such that a distance between said opposed surface and said first rail portion increases in a downward direction away from said upper surface of said first rail portion.

3. The sheet tray device according to claim 1, wherein said rotation-preventing slide portion of said support member has a length as measured in said rail extending direction, while said support member has a length as measured in said rail extending direction, such that said length of said rotation-preventing slide portion and said length of said support member are substantially equal to each other.

4. The sheet tray device according to claim 1, wherein said rotation-preventing slide portion of said support member extends in said rail extending direction substantially throughout an entirety of said support member.

5. An image forming apparatus comprising:

the sheet tray device defined in claim 1;

an image forming unit performing an image forming operation on a media sheet; and a sheet supplying unit supplying the media sheet held by said sheet tray device, to said image forming unit.

6. The sheet tray device according to claim 1, wherein said first and second rail portions are offset from each other in said lateral direction such that said second rail portion located on an outer side of said first rail portion in said lateral direction.

7. The sheet tray device according to claim 6, wherein said single piece providing at least said bottom wall and said opposite side walls of said first tray is a product that is molded in an injection molding using upper and lower mold halves.

8. The sheet tray device according to claim 7, wherein said single piece is made of a resin.

9. The sheet tray device according to claim 1, wherein each of said first and second rail portions is provided by a plate-like shaped portion having a width as measured in said vertical direction and a thickness as measured in said lateral direction such that said width is larger than said thickness.

*10. The sheet tray device according to claim 1, which is removably introduced into the main body of the image forming apparatus through the opening of the main body.*

*11. The sheet tray device according to claim 1, wherein said second tray accommodates the second size sheet having a size less than a size of the first size sheet.*

*12. The sheet tray device according to claim 1, wherein each of said opposite side walls of said first tray includes said first and second rail portions.*

*13. The sheet tray device according to claim 1, which is removably introduced into the main body of the image forming apparatus through the opening of the main body,*

*wherein said second tray accommodates the second size sheet having a size that is smaller than a size of the first size sheet, and*

*wherein each of said opposite side walls of said first tray includes said first and second rail portions.*

* * * * *